United States Patent
Tanaka

(10) Patent No.: US 11,377,101 B2
(45) Date of Patent: Jul. 5, 2022

(54) INFORMATION PROCESSING APPARATUS, INFORMATION PROCESSING METHOD, AND VEHICLE

(71) Applicant: SONY CORPORATION, Tokyo (JP)

(72) Inventor: Nobuyuki Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 69 days.

(21) Appl. No.: 16/763,213

(22) PCT Filed: Nov. 6, 2018

(86) PCT No.: PCT/JP2018/041094
§ 371 (c)(1),
(2) Date: May 11, 2020

(87) PCT Pub. No.: WO2019/098081
PCT Pub. Date: May 23, 2019

(65) Prior Publication Data
US 2020/0298849 A1    Sep. 24, 2020

(30) Foreign Application Priority Data

Nov. 20, 2017  (JP) .............................. JP2017-222456

(51) Int. Cl.
B60W 30/095 (2012.01)
G08G 1/01 (2006.01)
(Continued)

(52) U.S. Cl.
CPC .... B60W 30/0956 (2013.01); B60W 30/0953 (2013.01); G06V 20/588 (2022.01); G06V 20/597 (2022.01); G08G 1/0145 (2013.01)

(58) Field of Classification Search
CPC ................. B60W 30/10; B60W 30/12; B60W 30/18163; B60W 40/04
See application file for complete search history.

(56) References Cited

U.S. PATENT DOCUMENTS 9,076,340 B2 * 7/2015 Wong ................. G06K 9/00805
2015/0194055 A1 * 7/2015 Maass .................... G08G 1/163
340/905
(Continued)

FOREIGN PATENT DOCUMENTS

| JP | 2010-211304 A | 9/2010 |
| JP | 2011-162132 A | 8/2011 |
| JP | 2017-174345 A | 9/2017 |

OTHER PUBLICATIONS

International Search Report and Written Opinion of PCT Application No. PCT/JP2018/041094, dated Feb. 12, 2019, 07 pages of ISRWO.

*Primary Examiner* — Peter D Nolan
*Assistant Examiner* — Ce Li Li
(74) *Attorney, Agent, or Firm* — Chip Law Group

(57) ABSTRACT

Provided is an information processing apparatus that includes a vehicle recognition unit that performs recognition of a vehicle in a second lane that is adjacent to a first lane in which an own vehicle is traveling, and has a same traveling direction as the first lane, and a flow detection unit that detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

9 Claims, 9 Drawing Sheets

(51) Int. Cl.
  *G06K 9/00*   (2022.01)
  *G06V 20/56*  (2022.01)
  *G06V 20/59*  (2022.01)

(56) References Cited

U.S. PATENT DOCUMENTS

| | | | |
|---|---|---|---|
| 2017/0341652 A1* | 11/2017 | Sugawara | G08G 1/166 |
| 2018/0326985 A1* | 11/2018 | Hermann | B60W 40/08 |
| 2019/0072970 A1* | 3/2019 | Izu | G05D 1/0257 |
| 2021/0163010 A1* | 6/2021 | Takabayashi | B60W 40/02 |
| 2021/0300246 A1* | 9/2021 | Peterson | G06K 9/00805 |

\* cited by examiner

FIG. 6

INFORMATION PROCESSING APPARATUS, INFORMATION PROCESSING METHOD, AND VEHICLE

CROSS REFERENCE TO RELATED APPLICATIONS

This application is a U.S. National Phase of International Patent Application No. PCT/JP2018/041094 filed on Nov. 6, 2018, which claims priority benefit of Japanese Patent Application No. JP 2017-222456 filed in the Japan Patent Office on Nov. 20, 2017. Each of the above-referenced applications is hereby incorporated herein by reference in its entirety.

TECHNICAL FIELD

The present technology relates to an information processing apparatus, an information processing method, a program, and a vehicle, and particularly to an information processing apparatus, an information processing method, a program, and a vehicle that are preferably used in a case where a flow of a vehicle in an adjacent lane is detected.

BACKGROUND

Conventionally, in a case where it is determined that a lane along a road where an own vehicle is traveling is congested, and in a case where it is determined that an adjacent lane along the road is not congested, it has been proposed to perform a lane change to the adjacent lane along the road (e.g., see Patent Document 1).

CITATION LIST

Patent Document

Patent Document 1: Japanese Patent Application Laid-Open No. 2011-162132

SUMMARY OF THE INVENTION

Problem to be Solved by the Invention

However, in Patent Document 1, a method for determining which of the lane along the road where the own vehicle is traveling and the adjacent lane along the road is congested has not been considered.

The present technology has been achieved in light of such a situation, and is to enable a flow of a vehicle in a lane where an own vehicle is traveling, and a flow of a vehicle in a next lane to be compared.

Solutions to Problem

An information processing apparatus according to a first aspect of the present technology includes: a vehicle recognition unit that performs recognition of a vehicle in a second lane that is adjacent to a first lane in which an own vehicle is traveling, and has a same traveling direction as the first lane; and a flow detection unit that detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

In an information processing method according to the first aspect of the present technology, an information processing apparatus performs recognition of a vehicle in a second lane that is adjacent to a first lane in which an own vehicle is traveling, and has a same traveling direction as the first lane, and detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

A program according to the first aspect of the present technology that causes a computer to execute processing for: performing recognition of a vehicle in a second lane that is adjacent to a first lane in which an own vehicle is traveling, and has a same traveling direction as the first lane; and detecting a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

A vehicle according to a second aspect of the present technology includes: a vehicle recognition unit that performs recognition of a vehicle in a second lane that is adjacent to a first lane in which an own vehicle is traveling, and has a same traveling direction as the first lane; a flow detection unit that detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane; and a motion control unit that controls a lane change in accordance with the first difference or the second difference.

In the first aspect of the present technology, the recognition of the vehicle in the second lane that is adjacent to the first lane in which the own vehicle is traveling and has the same traveling direction as the first lane is performed, and the first difference between the number of vehicles in the second lane by which the own vehicle has been caught up with and the number of vehicles in the second lane that the own vehicle has caught up with, or the second difference between the number of vehicles in the second lane by which the own vehicle has been overtaken, and the number of vehicles in the second lane that the own vehicle has overtaken is detected on the basis of the recognition result of the vehicle in the second lane.

In the second aspect of the present technology, the recognition of the vehicle in the second lane that is adjacent to the first lane in which the own vehicle is traveling and has the same traveling direction as the first lane is performed, the first difference between the number of vehicles in the second lane by which the own vehicle has been caught up with and the number of vehicles in the second lane that the own vehicle has caught up with, or the second difference between the number of vehicles in the second lane by which the own vehicle has been overtaken, and the number of vehicles in the second lane that the own vehicle has overtaken is detected on the basis of the recognition result of the vehicle in the second lane, and the control is made so as to perform the lane change in accordance with the first difference and the second difference.

Effects of the Invention

According to the first aspect or the second aspect of the present technology, it is possible to compare the flow of the vehicle in the lane in which the own vehicle is traveling and the flow in the next lane. As a result, it is possible to appropriately propose or carry out a lane change to the next lane.

Note that the effects described here are not necessarily limited, and the effect may be any of the effects described in the present disclosure.

BRIEF DESCRIPTION OF DRAWINGS

FIG. 6 is a diagram for describing a specific example of a counting method of a flow comparison counter.

MODE FOR CARRYING OUT THE INVENTION

Hereinafter, an embodiment for carrying out the present technology will be described. The description will be given in the following order.

Figure 1:
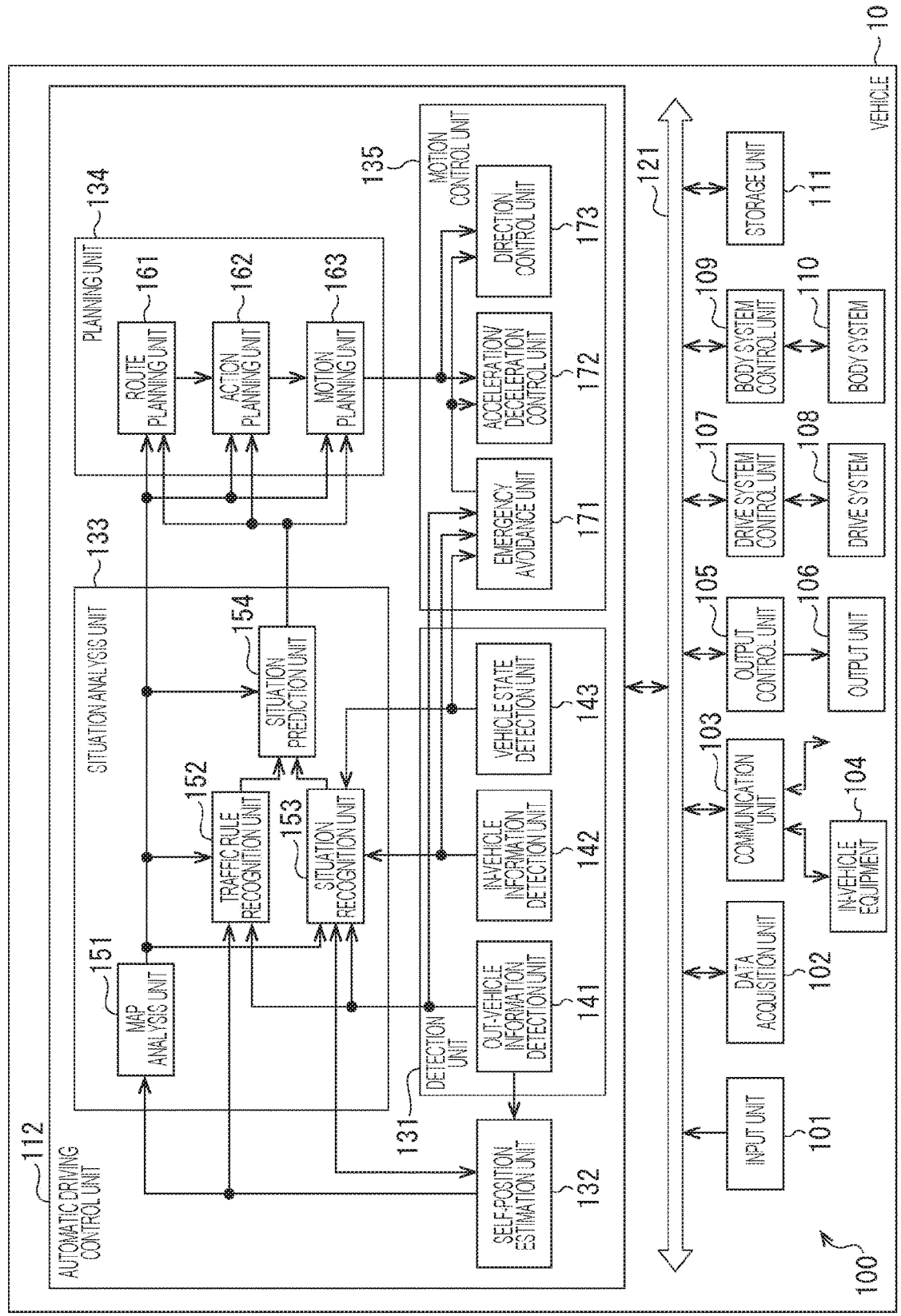
FIG. 1 is a block diagram showing a schematic functional configuration example of a vehicle control system to which the present technology can be applied.

1. Configuration example of vehicle control system
2. Embodiment
3. Modifications
4. Others 1. Configuration Example of Vehicle Control System FIG. 1 is a block diagram showing a schematic functional configuration example of a vehicle control system 100, which is one example of a moving body control system to which the present technology can be applied.

The vehicle control system 100 is a system that is provided in a vehicle 10 and performs various controls of the vehicle 10. Hereinafter, note that in a case where the vehicle 10 is distinguished from other vehicles, it is referred to as an own car or an own vehicle.

The vehicle control system 100 includes an input unit 101, a data acquisition unit 102, a communication unit 103, in-vehicle equipment 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are interconnected via a communication network 121. The communication network 121 includes, for example, an in-vehicle communication network, a bus or the like that conforms to any standard such as a controller area network (CAN), a local interconnect network (LIN), a local area network (LAN), or FlexRay (registered trademark), or the like. Note that each of the units of the vehicle control system 100 may be directly connected without intervening the communication network 121.

Note that hereinafter, in a case where each of the units of the vehicle control system 100 performs communication via the communication network 121, description of the communication network 121 will be omitted. For example, in a case where the input unit 101 and the automatic driving control unit 112 perform the communication via the communication network 121, it is simply described that the input unit 101 and the automatic driving control unit 112 perform the communication.

The input unit 101 includes an apparatus used for a passenger to input various types of data, instructions and the like. For example, the input unit 101 includes operation devices such as a touch panel, a button, a microphone, a switch, a lever, and the like, and an operation device or the like that enables input by a method other than a manual operation using voice, a gesture, or the like. Moreover, for example, the input unit 101 may be a remote control apparatus using infrared rays or other radio waves, or external connection equipment such as mobile equipment, wearable equipment or the like corresponding to an operation of the vehicle control system 100. The input unit 101 generates an input signal on the basis of data, instructions, or the like, input by a passenger, and supplies the input signal to each of the units of the vehicle control system 100.

The data acquisition unit 102 includes various sensors or the like that acquire data used for processing of the vehicle control system 100, and supplies the acquired data to each of the units of the vehicle control system 100.

For example, the data acquisition unit 102 includes various sensors configured to detect a state of the vehicle 10 and the like. Specifically, for example, the data acquisition unit 102 includes a gyro sensor, an acceleration sensor, an inertial measurement apparatus (IMU), and sensors and the like configured to detect an operation amount of an accelerator pedal, an operation amount of a brake pedal, a steering angle of a steering wheel, an engine speed, a motor rotation speed or a rotation speed of a wheel, and the like.

Moreover, for example, the data acquisition unit 102 includes various sensors configured to detect information of an outside of the vehicle 10. Specifically, for example, the data acquisition unit 102 includes an imaging apparatus such as a time of flight (ToF) camera, a stereo camera, a monocular camera, an infrared camera, other cameras, or the like. Moreover, for example, the data acquisition unit 102 includes an environment sensor configured to detect weather, atmospheric phenomena, or the like, and a surrounding information detection sensor configured to detect an object around the vehicle 10. The environmental sensor includes, for example, a raindrop sensor, a fog sensor, a sunshine sensor, a snow sensor, and the like. The surrounding information detection sensor includes, for example, an ultrasonic sensor, a radar, a light detection and ranging, laser imaging detection and ranging (LiDAR), a sonar, and the like.

Further, for example, the data acquisition unit 102 includes various sensors configured to detect a current position of the vehicle 10. Specifically, for example, the data acquisition unit 102 includes a global navigation satellite system (GNSS) receiver that receives a GNSS signal from a GNSS satellite, and the like.

Moreover, for example, the data acquisition unit 102 includes various sensors configured to detect information of an inside of the vehicle. Specifically, for example, the data acquisition unit 102 includes an imaging apparatus that images a driver, a biological sensor that detects biological information of the driver, a microphone that collects sound in a vehicle interior, and the like. The biological sensor is provided on, for example, a seat surface, the steering wheel, or the like to detect the biological information of a passenger sitting on a seat or the driver holding the steering wheel.

The communication unit 103 communicates with the in-vehicle equipment 104 and various types of equipment outside the vehicle, a server, a base station, and the like, transmits data supplied from each of the units of the vehicle control system 100, and transmits received data to each of the units of the vehicle control system 100. Note that a communication protocol supported by the communication unit 103 is not particularly limited, and the communication unit 103 can support a plurality of types of communication protocols.

For example, the communication unit 103 performs wireless communication with the in-vehicle equipment 104 by a wireless LAN, Bluetooth (registered trademark), a near field communication (NFC), a wireless USB (WUSB), or the like. Moreover, for example, the communication unit 103 performs wired communication with the in-vehicle equipment 104 via a connection terminal not shown (and a cable if necessary) by a universal serial bus (USB), a high-definition multimedia interface (HDMI (registered trademark)), a mobile high-definition link (MHL) or the like.

Further, for example, the communication unit 103 communicates with equipment (e.g., an application server or a control server) existing on an external network (e.g., the Internet, a cloud network, or a company-specific network) via a base station or an access point. Communicate. Moreover, for example, the communication unit 103 uses a peer to peer (P2P) technology to communicate with a terminal (e.g., a terminal of a pedestrian or in a store, or a machine type communication (MTC) terminal) that exists in a vicinity of the vehicle 10. Further, for example, the communication unit 103 performs V2X communication such as communication between a vehicle and a vehicle (vehicle to vehicle communication), communication between a road and a vehicle (vehicle to infrastructure communication), communication between the vehicle 10 and home (vehicle to home communication), and communication between a pedestrian and a vehicle (vehicle to pedestrian communication), and the like. Moreover, for example, the communication unit 103 includes a beacon receiving unit, receives radio waves or electromagnetic waves transmitted from radio stations or the like installed on a road, and acquires information such as the current position, traffic jam, traffic regulation, required time and the like.

The in-vehicle equipment 104 includes, for example, mobile equipment or wearable equipment possessed by a passenger, information equipment that is carried in or attached to the vehicle 10, a navigation apparatus that searches for a route to an arbitrary destination, and the like.

The output control unit 105 controls output of the various types of information with respect to the passenger or the outside of the vehicle 10. For example, the output control unit 105 generates an output signal including at least one of visual information (e.g., image data) and auditory information (e.g., audio data), and supplies the output signal to the output unit 106 to thereby control the output of the visual information and the auditory information from the output unit 106. Specifically, for example, the output control unit 105 generates an overhead image or a panoramic image by synthesizing image data captured by different imaging apparatuses of the data acquisition unit 102, and outputs the output signal including the generated image to the output unit 106. Moreover, for example, the output control unit 105 generates audio data including a warning sound, a warning message or the like against danger such as a collision, a contact, an entry into a dangerous zone, and the like, and outputs an output signal including the generated audio data to the output unit 106.

The output unit 106 includes an apparatus capable of outputting the visual information or the auditory information to the passenger or the outside of the vehicle 10. For example, the output unit 106 includes a display apparatus, an instrument panel, an audio speaker, a headphone, a wearable device such as a glasses-type display or the like worn by a passenger, a projector, a lamp, and the like. The display apparatus included by the output unit 106 may be, in addition to an apparatus having a normal display, an apparatus that displays the visual information inside a visual field of the driver such as, for example, a head-up display, a transmissive display, and an apparatus having an augmented reality (AR) display function or the like.

The drive system control unit 107 controls the drive system 108 by generating various control signals and supplying them to the drive system 108. Moreover, the drive system control unit 107 supplies a control signal to each of the units other than the drive system 108 as necessary, and performs notification of a control state of the drive system 108, and the like.

The drive system 108 includes various apparatus related to a drive system of the vehicle 10. For example, the drive system 108 includes a driving force generation apparatus configured to generate a driving force such as the internal combustion engine, the driving motor, or the like, a driving force transmission mechanism configured to transmit the driving force to wheels, a steering mechanism that adjusts the steering angle, a braking apparatus that generates a braking force, an antilock brake system (ABS), an electronic stability control (ESC), an electric power steering apparatus, and the like.

The body system control unit 109 controls the body system 110 by generating various control signals and supplying them to the body system 110. Moreover, the body system control unit 109 supplies a control signal to each of the units other than the body system 110 as necessary, and performs notification of a control state of the body system 110, and the like.

The body system 110 includes various apparatuses of the body system that are mounted on a vehicle body. For example, the body system 110 includes a keyless entry system, a smart key system, a power window apparatus, a power seat, a steering wheel, an air conditioning apparatus, various lamps (e.g., head lamps, back lamps, brake lamps, blinkers, fog lamps, etc.) and the like.

The storage unit 111 includes, for example, a magnetic storage device such as a read only memory (ROM), a random access memory (RAM), a hard disc drive (HDD) or the like, a semiconductor storage device, an optical storage device, a magneto-optical storage device, or the like. The storage unit 111 stores various programs, data, and the like used by each of the units of the vehicle control system 100. For example, the storage unit 111 stores map data such as a three-dimensional high-accuracy map such as a dynamic map or the like, a global map that is less accurate than a high-accuracy map and covers a wide area, a local map that includes information around the vehicle 10, and the like.

The automatic driving control unit 112 performs control related to automatic driving such as autonomous driving, driving support or the like. Specifically, for example, the automatic driving control unit 112 performs cooperative control that aims at realization of functions of an advanced driver assistance system (ADAS) including collision avoidance or impact mitigation, following traveling based on an inter-vehicle distance, vehicle speed maintaining traveling of the vehicle 10, collision warning of the vehicle 10 or lane departure warning of the vehicle 10, and the like. Moreover, for example, the automatic driving control unit 112 performs cooperative control that aims at the automatic driving in which the vehicle autonomously travels without depending on an operation of the driver, or the like. The automatic driving control unit 112 includes a detection unit 131, a self-position estimation unit 132, a situation analysis unit 133, a planning unit 134, and a motion control unit 135.

The detection unit 131 detects various types of information necessary for controlling the automatic driving. The detection unit 131 includes an out-vehicle information detection unit 141, an in-vehicle information detection unit 142, and a vehicle state detection unit 143.

The out-vehicle information detection unit 141 performs the detection processing of information of the outside of the vehicle 10 on the basis of the data or the signal from each of the units of the vehicle control system 100. For example, the out-vehicle information detection unit 141 performs detection processing, recognition processing, and tracking processing of an object around the vehicle 10, and detection processing of a distance to the object. The object to be detected includes, for example, a vehicle, a person, an obstacle, a structure, a road, a traffic light, a traffic sign, a road marking, and the like. Moreover, for example, the out-vehicle information detection unit 141 performs detection processing of a surrounding environment of the vehicle 10. The surrounding environment to be detected includes, for example, weather, an air temperature, a humidity, a brightness, a road surface condition, and the like. The out-vehicle information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the motion control unit 135, and the like.

The in-vehicle information detection unit 142 performs detection processing of information of the inside of the vehicle on the basis of the data or the signal from each of the units of the vehicle control system 100. For example, the in-vehicle information detection unit 142 performs authentication processing and recognition processing of the driver, detection processing of a state of the driver, detection processing of the passenger, detection processing of the environment inside the vehicle, and the like. The state of the driver to be detected includes, for example, a physical condition, an arousal level, a concentration level, a fatigue level, a line-of-sight direction, and the like. The environment inside the vehicle to be detected includes, for example, an air temperature, a humidity, a brightness, a smell, and the like. The in-vehicle information detection unit 142 supplies data indicating a result of the detection processing to the situation recognition unit 153 of the situation analysis unit 133, the emergency avoidance unit 171 of the motion control unit 135, and the like.

The vehicle state detection unit 143 performs detection processing of a state of the vehicle 10 on the basis of the data or the signal from each of the units of the vehicle control system 100. The state of the vehicle 10 to be detected includes, for example, a speed, an acceleration, a steering angle, presence/absence and a content of abnormality, a state of a driving operation, a position and an inclination of the power seat, a state of door lock, states of other in-vehicle equipment, and the like. The vehicle state detection unit 143 supplies data indicating a result of the detection processing to the situation recognition unit 153 of the situation analysis unit 133, the emergency avoidance unit 171 of the motion control unit 135, and the like.

The self-position estimation unit 132 performs estimation processing of the position, a posture, and the like of the vehicle 10 on the basis of the data or the signal from each of the units of the vehicle control system 100 such as the out-vehicle information detection unit 141 and the situation recognition unit 153 of the situation analysis unit 133 and the like. Moreover, the self-position estimation unit 132 generates a local map (hereinafter, referred to as a map for self-position estimation) used for estimation of a self-position as necessary. The map for self-position estimation is, for example, a high-accuracy map using a technique such as simultaneous localization and mapping (SLAM) or the like. The self-position estimation unit 132 supplies data indicating a result of the estimation processing to the map analysis unit 151, the traffic rule recognition unit 152, the situation recognition unit 153 of the situation analysis unit 133, and the like. Moreover, the self-position estimation unit 132 causes the storage unit 111 to store the map for self-position estimation.

The situation analysis unit 133 performs analysis processing of situations of the vehicle 10 and surroundings. The situation analysis unit 133 includes the map analysis unit 151, the traffic rule recognition unit 152, the situation recognition unit 153, and a situation prediction unit 154.

Using the data or the signal from each of the units of the vehicle control system 100 such as the self-position estimation unit 132, the out-vehicle information detection unit 141, and the like as necessary, the map analysis unit 151 performs analysis processing of the various types of maps stored in the storage unit 111, and constructs a map including information necessary for the automatic driving. The map analysis unit 151 supplies the constructed map to the traffic rule recognition unit 152, the situation recognition unit 153, and the situation prediction unit 154, and a route planning unit 161, an action planning unit 162, and a motion planning unit 163 of the planning unit 134, and the like.

The traffic rule recognition unit 152 performs recognition processing of a traffic rule around the vehicle 10 on the basis of the data or the signal from each of the units of the vehicle control system 100 such as the self-position estimation unit 132, the out-vehicle information detection unit 141, the map analysis unit 151, and the like. This recognition processing allows, for example, the position and the state of a traffic light around the vehicle 10, a content of traffic regulation around the vehicle 10, and the lanes where the vehicle can travel, and the like to be recognized. The traffic rule recognition unit 152 supplies data indicating a result of the recognition processing to the situation prediction unit 154 and the like.

The situation recognition unit 153 performs recognition processing of a situation related to the vehicle 10 on the basis of the data or the signal from each of the units of the vehicle control system 100 such as the self-position estimation unit 132, the out-vehicle information detection unit 141, the in-vehicle information detection unit 142, the vehicle state detection unit 143, the map analysis unit 151, and the like. For example, the situation recognition unit 153 performs the recognition processing of the situation of the vehicle 10, the situation around the vehicle 10, a situation of the driver of the vehicle 10, and the like. Moreover, the situation recognition unit 153 generates a local map (hereinafter referred to as a map for situation recognition) used for recognition of the situation around the vehicle 10 as necessary. The map for situation recognition is, for example, an occupancy grid map.

The situation of the vehicle 10 to be recognized includes, for example, the position, the posture, and movement (e.g., the speed, the acceleration, a moving direction, etc.) of the vehicle 10, the presence/absence and the content of abnormality, and the like. The situation around the vehicle 10 to be recognized includes, for example, a type and a position of a surrounding stationary object, a type, a position, and movement of a surrounding moving object (e.g., a speed, an acceleration, a moving direction, etc.), a configuration and a road surface condition of a surrounding road, and ambient weather, an air temperature, a humidity, a brightness, and the like. The state of the driver to be recognized includes, for example, a physical condition, an arousal level, a concentration level, a fatigue level, a line-of-sight movement, a driving operation, and the like.

The situation recognition unit 153 supplies data (including the map for situation recognition as necessary) indicating a result of the recognition processing to the self-position estimation unit 132, the situation prediction unit 154, and the like. Moreover, the situation recognition unit 153 causes the storage unit 111 to store the map for situation recognition.

The situation prediction unit 154 performs prediction processing of the situation related to the vehicle 10 on the basis of the data or the signal from each of the units of the vehicle control system 100 such as the map analysis unit 151, the traffic rule recognition unit 152, the situation recognition unit 153, and the like. For example, the situation prediction unit 154 performs the prediction processing of the situation of the vehicle 10, the situation around the vehicle 10, the situation of the driver, and the like.

The situation of the vehicle 10 to be predicted includes, for example, a behavior, occurrence of abnormality, a travelable distance, and the like of the vehicle 10. The situation around the vehicle 10 to be predicted includes, for example, a behavior of a moving object around the vehicle 10, change in a state of a traffic light, change in the environment such as weather, and the like. The situation of the driver to be predicted includes, for example, a behavior, a physical condition and the like of the driver.

The situation prediction unit 154 supplies data indicating a result of the prediction processing to the route planning unit 161, the action planning unit 162, the motion planning unit 163 of the planning unit 134, and the like together with the data from the traffic rule recognition unit 152 and the situation recognition unit 153.

The route planning unit 161 plans a route to a destination on the basis of the data or the signal from each of the units of the vehicle control system 100 such as the map analysis unit 151, the situation prediction unit 154, and the like. For example, the route planning unit 161 sets a route from the current position to a designated destination on the basis of the global map. Moreover, for example, the route planning unit 161 changes the route as appropriate on the basis of the situations such as a traffic jam, an accident, traffic regulation, construction work, and the like, and a physical condition of the driver. The route planning unit 161 supplies data indicating the planned route to the action planning unit 162 and the like.

The action planning unit 162 plans an action of the vehicle 10 for safely traveling on the route planned by the route planning unit 161 within a planned time on the basis of the data or the signal from each of the units of the vehicle control system 100 such as the map analysis unit 151, the situation prediction unit 154, and the like. For example, the action planning unit 162 performs planning of start, stop, a traveling direction (e.g., forward, backward, left turn, right turn, direction change, etc.), a traveling lane, a traveling speed, overtaking, and the like. The action planning unit 162 supplies data indicating the planned action of the vehicle 10 to the motion planning unit 163 and the like.

The motion planning unit 163 plans a motion of the vehicle 10 for realizing the action planned by the action planning unit 162 on the basis of the data or the signal from each of the units of the vehicle control system 100 such as the map analysis unit 151, the situation prediction unit 154, and the like. For example, the motion planning unit 163 performs planning such as an acceleration, a deceleration, a traveling track, and the like. The motion planning unit 163 supplies data indicating the planned motion of the vehicle 10 to an acceleration/deceleration control unit 172, a direction control unit 173, and the like of the motion control unit 135.

The motion control unit 135 controls the motion of the vehicle 10. The motion control unit 135 includes the emergency avoidance unit 171, the acceleration/deceleration control unit 172, and the direction control unit 173.

The emergency avoidance unit 171 performs the detection processing of an emergency such as a collision, a contact, an entry into a dangerous zone, abnormality of the driver, abnormality of the vehicle 10, or the like on the basis of the detection results of the out-vehicle information detection unit 141, the in-vehicle information detection unit 142, and the vehicle state detection unit 143. When detecting occurrence of an emergency, the emergency avoidance unit 171 plans the motion of the vehicle 10 to avoid the emergency, such as sudden stop, steep turn, or the like. The emergency avoidance unit 171 supplies data indicating the planned motion of the vehicle 10 to the acceleration/deceleration control unit 172, the direction control unit 173, and the like.

The acceleration/deceleration control unit 172 performs acceleration/deceleration control for realizing the motion of the vehicle 10 planned by the motion planning unit 163 or the emergency avoidance unit 171. For example, the acceleration/deceleration control unit 172 arithmetically operates a control target value of the driving force generation apparatus or the braking apparatus configured to realize the planned acceleration, deceleration, or sudden stop, and supplies a control command indicating the arithmetically operated control target value to the drive system control unit 107.

The direction control unit 173 performs direction control for realizing the motion of the vehicle 10 planned by the motion planning unit 163 or the emergency avoidance unit 171. For example, the direction control unit 173 arithmetically operates a control target value of the steering mechanism for realizing a traveling track or steep turn planned by the motion planning unit 163 or the emergency avoidance unit 171, and performs a control command indicating the arithmetically operated control target value to the drive system control unit 107.

2. Embodiment

Next, an embodiment of the present technology will be described with reference to FIGS. 2 to 8.

Note that this embodiment is mainly related to the processing of the data acquisition unit 102, the output control unit 105, the output unit 106, the self-position estimation unit 132, the situation analysis unit 133, the motion control unit 135, the action planning unit 162, and the motion planning unit 163 in the vehicle control system 100 shown in FIG. 1.

<Configuration Example of Lane Change Control System>

Figure 2:
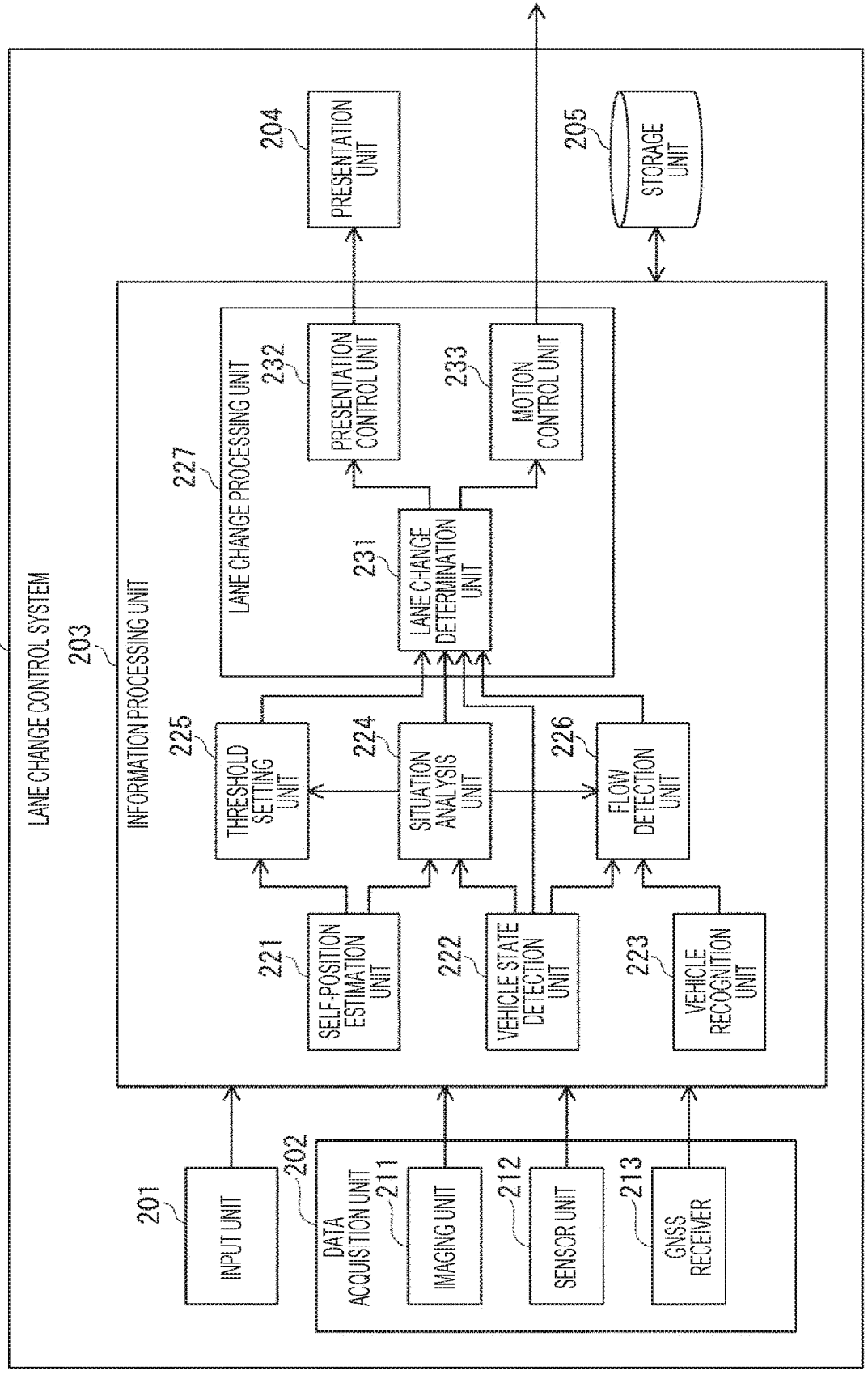
FIG. 2 is a block diagram showing one embodiment of a lane change control system to which the present technology is applied.

FIG. 2 is a block diagram showing a configuration example of a lane change control system 200 according to one embodiment of the present technology.

The lane change control system 200 is a system that detects a difference in flow of vehicles between a lane where the vehicle 10 provided with the lane change control system 200 is travelling (hereinafter, referred to as a traveling lane), and a lane that is adjacent to the traveling lane and has a same traveling direction as the traveling lane (hereinafter, referred to as an adjacent lane), and performs proposal or control of the late change, or the like on the basis of a result of the above-described detection. The lane change control system 200 includes an input unit 201, a data acquisition unit 202, an information processing unit 203, a presentation unit 204, and a storage unit 205.

The input unit 201 includes, for example, operation devices such as a touch panel, a button, a microphone, a switch, a lever, and the like, and an operation device or the like that enables input by a method other than a manual operation using a voice, a gesture, or the like. The input unit 201 generates an input signal on the basis of data, an instruction, and the like input by a passenger of the vehicle 10, and supplies the input signal to the information processing unit 203.

The data acquisition unit 202 includes an imaging unit 211, a sensor unit 212, and a GNSS receiver 213.

The imaging unit 211 includes one or more cameras, and images, for example, the surroundings in front, on sides, in rear, and the like of the vehicle 10. The imaging unit 211 supplies images resulting from the imaging to the information processing unit 203.

The sensor unit 212 includes various sensors configured to detect the state of the vehicle 10 and the like. For example, the sensor unit 212 includes a gyro sensor, an acceleration sensor, an inertial measurement unit (IMU), and a sensor and the like configured to detect an operation amount of the accelerator pedal, an operation amount of the brake pedal, a steering angle of the steering wheel, an engine speed, a motor rotation speed, a rotation speed of the wheels, or the like.

Moreover, the sensor unit 212 includes various sensors configured to detect the information of the outside of the vehicle 10. For example, the sensor unit 212 includes the surrounding information detection sensor configured to detect an object around the vehicle 10. The surrounding information detection sensor includes, for example, an ultrasonic sensor, a radar, an LiDAR, a sonar, and the like.

The sensor unit 212 supplies sensor data indicating a detection result of each of the sensors to the information processing unit 203.

The GNSS receiver 213 receives the GNSS signal transmitted from the GNSS positioning satellite (not shown) and supplies the received GNSS signal to the information processing unit 203.

The information processing unit 203 includes a self-position estimation unit 221, a vehicle state detection unit 222, a vehicle recognition unit 223, a situation analysis unit 224, a threshold setting unit 225, a flow detection unit 226, and a lane change processing unit 227.

The self-position estimation unit 221 performs self-position estimation of the vehicle 10 on the basis of the GNSS signal received by the GNSS receiver 213, and estimates the current position and the posture of the vehicle. The self-position estimation unit 221 supplies data indicating an estimation result to the situation analysis unit 224 and the threshold setting unit 225.

The vehicle state detection unit 222 performs detection processing of the state of the vehicle 10 on the basis of the sensor data from the sensor unit 212. The state of the vehicle 10 to be detected includes, for example, the speed, the acceleration, the steering angle, the presence/absence and the content of abnormality, the state of the driving operation, and the like. The vehicle state detection unit 222 supplies data indicating a detection result to the situation analysis unit 224, the flow detection unit 226, and a lane change determination unit 231 of the lane change processing unit 227.

The vehicle recognition unit 223 performs recognition processing of a vehicle in the adjacent lane on the basis of the images captured by the imaging unit 211, the sensor data from the sensor unit 212, and the like. The vehicle recognition unit 223 supplies data indicating a recognition result to the flow detection unit 226.

Moreover, the vehicle recognition unit 223 generates and updates next vehicle information indicating characteristics of the recognized vehicle in the adjacent lane, and causes the storage unit 205 to store the next vehicle information. The next vehicle information is used to distinguish vehicles in the adjacent lane, which is travelling next to the vehicle 10, and includes, for example, a vehicle type, a color, a shape, a vehicle number, a number and characteristics of the passengers, and the like.

The situation analysis unit 224 performs analysis processing of the vehicle 10 and the situation around the vehicle on the basis of the image around the vehicle 10, the sensor data from the sensor unit 212, the GNSS signal, the estimation result of the self-position of the vehicle 10, the state of the vehicle 10, the map data stored in the storage unit 205, and the like. For example, the situation analysis unit 224 analyzes characteristics and changes of the traveling road, and a speed limit, the inter-vehicle distance, the situation of the traveling direction of the vehicle 10, presence or absence of a lane change, and the like. The situation analysis unit 224 supplies data indicating an analysis result to the threshold setting unit 225, the flow detection unit 226, and the lane change determination unit 231 of the lane change processing unit 227.

The threshold setting unit 225 sets a lane change threshold used to determine a lane change. For example, in a case where automatic setting of the lane change threshold is enabled, the threshold setting unit 225 determines the lane change threshold on the basis of the road on which the vehicle 10 is traveling and a lane change history stored in the storage unit 205. On the other hand, in a case where the automatic setting of the lane change threshold is disabled, the threshold setting unit 225 sets the lane change threshold to, for example, a specified value. The threshold setting unit 225 supplies data indicating the set lane change threshold to the lane change determination unit 231.

Note that the automatic setting of the lane change threshold is set to be enabled or disabled, for example, by an operation of the passenger via the input unit 201.

Moreover, the lane change history is a record of a history of the lane change by an operation of the driver in the past. The lane change history includes, for example, a date and time when the lane change was performed, a road on which the lane change was performed, a value of a flow comparison counter at the time of the lane change, and the like. Note that division of the road for specifying the road on which the lane change was performed can be arbitrarily set.

Moreover, the flow comparison counter is a counter that indicates a result from comparing the flow of the vehicles between the traveling lane and the adjacent lane. For example, the flow comparison counter is represented by a difference value between a number of vehicles in the adjacent lane by which the vehicle 10 has been caught up with and a number of vehicles in the adjacent lane that the vehicle 10 has caught up with with predetermined timing used as a reference. For example, the flow comparison counter is increased by one when the vehicle 10 is caught up with by a vehicle in the adjacent lane, and is decreased by one when the vehicle 10 catches up with a vehicle in the adjacent lane. In this case, in a case where the number of vehicles in the adjacent lane by which the vehicle 10 has been caught up with is larger than the number of vehicles in the adjacent lane that the vehicle 10 has caught up with, that is, in a case where the flow of the vehicles is worse in the traveling lane than in the adjacent lane, the flow comparison counter takes a positive value. On the other hand, in a case where the number of vehicles in the adjacent lane that the vehicle 10 has caught up with is larger than the number of vehicles in the adjacent lane by which the vehicle 10 has been caught up with, that is, in a case where the flow of the vehicles is better in the traveling lane than in the adjacent lane, the flow comparison counter takes a negative value.

Note that the predetermined timing is, for example, when the vehicle 10 enters or joins to a new road, changes lanes, or the like.

The flow detection unit 226 updates the flow comparison counter on the basis of the speed of the vehicle 10 and the recognition result of the vehicle in the adjacent lane, thereby detecting the difference in the flow of the vehicles between the traveling lane and the adjacent lane. The flow detection unit 226 supplies data indicating the value of the flow comparison counter to the lane change determination unit 231.

The lane change processing unit 227 performs lane change processing related to the lane change of the vehicle 10. The lane change processing unit 227 includes the lane change determination unit 231, a presentation control unit 232, and a motion control unit 233.

The lane change determination unit 231 determines whether or not it is better to change the lane to the adjacent lane on the basis of the situation in the traveling direction of the vehicle 10, the lane change threshold, and the flow comparison counter. In a case where the lane change determination unit 231 determines that it is better to change the lane to the adjacent lane, the lane change determination unit 231 instructs the presentation control unit 232 to propose a lane change or instructs the motion control unit 233 to carry out the lane change.

Moreover, the lane change determination unit 231 generates and updates the lane change history.

Furthermore, in a case where automatic setting of a lane change control function is enabled, the lane change determination unit 231 makes setting to enable or disable the lane change control function on the basis of an inter-vehicle distance from an immediately preceding vehicle, the speed limit of the traveling road, and the speed of the vehicle 10.

Note that the automatic setting of the lane change control function is set so as to be enabled or disabled, for example, by an operation of the passenger via the input unit 201.

The presentation control unit 232 controls the presentation unit 204 to propose, to the driver, a lane change to the adjacent lane.

The motion control unit 233, for example, controls the drive system control unit 107 of the vehicle 10 in FIG. 1 to carry out the lane change of the vehicle 10.

The presentation unit 204 includes an apparatus that performs presentation of the information by an image, sound, light, vibration, or the like of a display, a speaker, a lighting apparatus, a vibrator, and the like.

The storage unit 205 stores the map data, the lane change history, and the like.

<Lane Change Control Processing>

Figure 3:
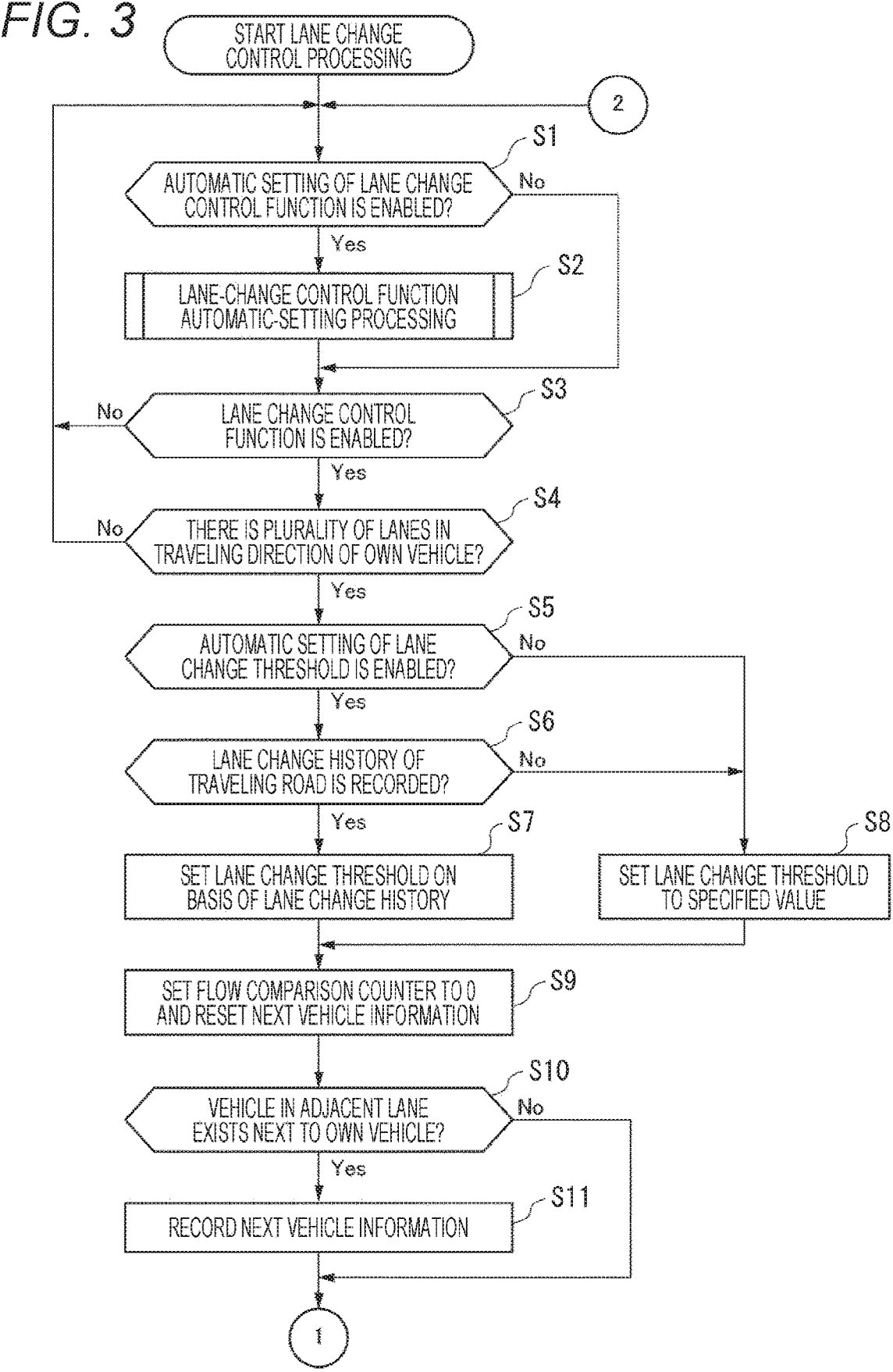
FIG. 3 is a flowchart for describing lane change control processing.
Figure 4:
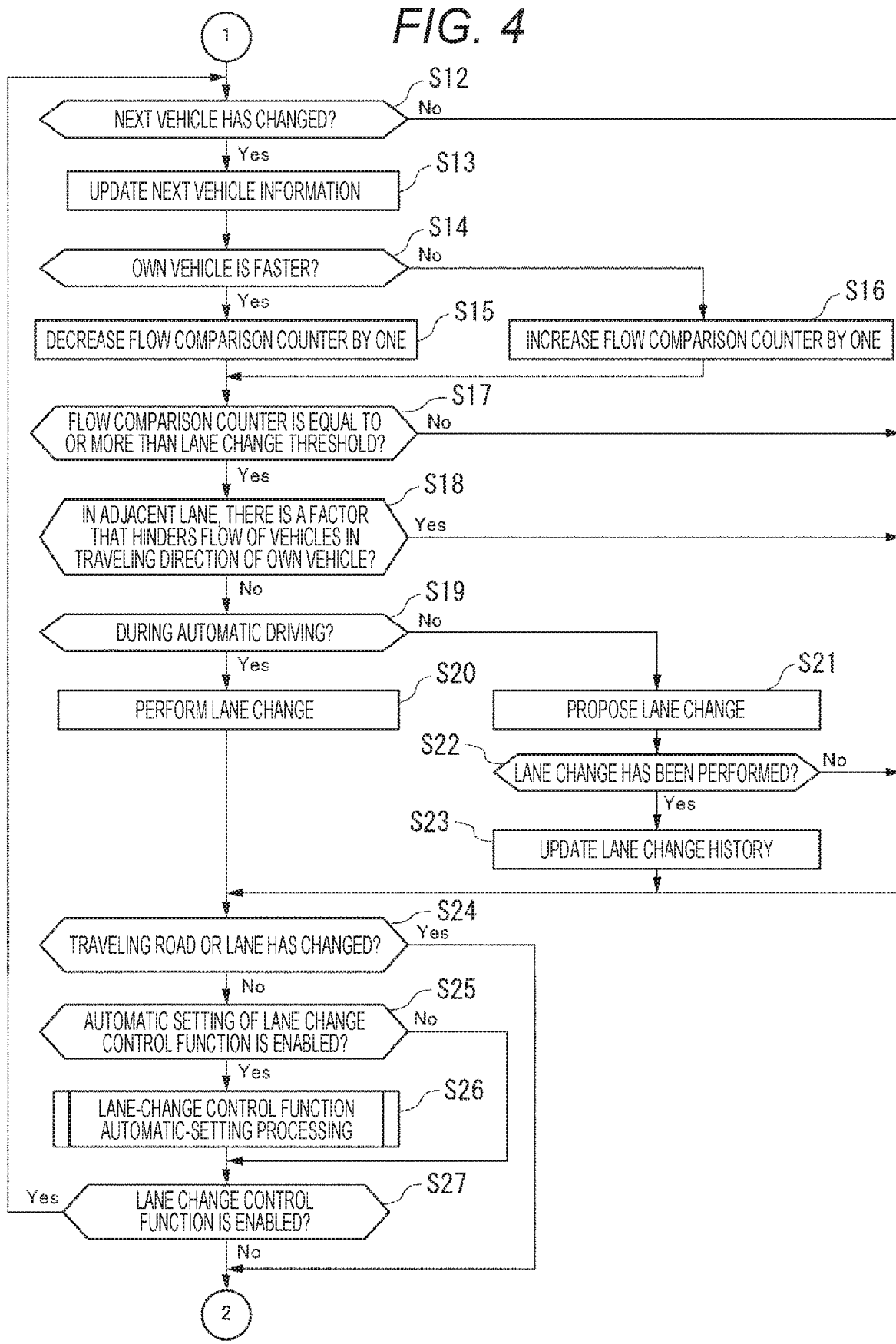
FIG. 4 is a flowchart for describing the lane change control processing.

Next, referring to flowcharts of FIGS. 3 and 4, lane change control processing executed by the lane change control system 200 will be described. Note that this processing is started, for example, when an operation for starting the vehicle 10 and starting driving is performed, for example, when an ignition switch, a power switch, a start switch, or the like of the vehicle 10 is turned on. Moreover, this processing ends, for example, when an operation for ending driving is performed, for example, when the ignition switch, the power switch, the start switch, or the like of the vehicle 10 is turned off.

Note that in the following, in order to simplify the description, a case will be mainly described in which a number of the lanes adjacent to the traveling lane of the vehicle 10 is only one.

In step S1, the lane change determination unit 231 determines whether or not the automatic setting of the lane change control function is enabled. In a case where it is determined that the automatic setting of the lane change control function is enabled, the processing proceeds to step S2.

In step S2, the information processing unit 203 executes lane-change control function automatic-setting processing, and the processing proceeds to step S3.

Figure 5:
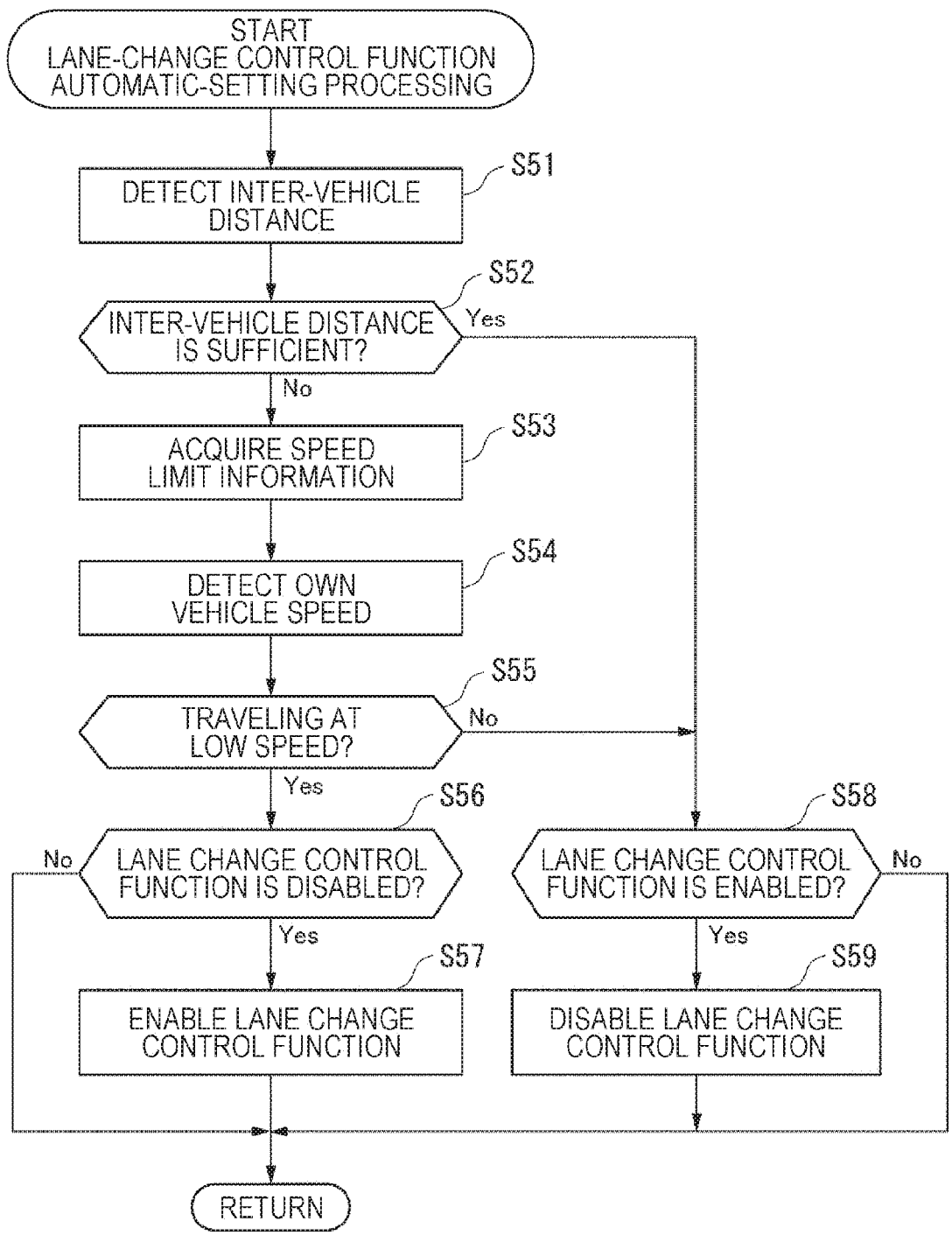
FIG. 5 is a flowchart for describing details of lane-change control function automatic-setting processing.

Here, details of the lane-change control function automatic-setting processing will be described with reference to a flowchart of FIG. 5.

In step S51, the situation analysis unit 224 detects the inter-vehicle distance. For example, the situation analysis unit 224 performs the detection processing of an immediately preceding vehicle in the traveling lane by a predetermined method on the basis of at least one of the image in front of the vehicle 10 captured by the imaging unit 211 and the sensor data from the sensor unit 212. The situation analysis unit 224 detects an inter-vehicle distance between the detected vehicle and the vehicle 10. The situation analysis unit 224 supplies data indicating the detected inter-vehicle distance to the lane change determination unit 231.

Note that methods for detecting the vehicle in front and the inter-vehicle distance are not particularly limited.

In step S52, the lane change determination unit 231 determines whether or not the inter-vehicle distance is sufficient. For example, in a case where the inter-vehicle distance is less than a predetermined threshold, the lane change determination unit 231 determines that the inter-vehicle distance is not sufficient, and the processing proceeds to step S53.

In step S53, the situation analysis unit 224 acquires speed limit information. Specifically, the self-position estimation unit 221 estimates the current position of vehicle 10 on the basis of the GNSS signal received by the GNSS receiver 213. The self-position estimation unit 221 supplies the data indicating the current position of the vehicle 10 to the situation analysis unit 224. The situation analysis unit 224 acquires the speed limit information of the road on which the vehicle 10 is traveling on the basis of the current position of the vehicle 10 and the map data stored in the storage unit 205. The situation analysis unit 224 supplies the acquired speed limit information to the lane change determination unit 231.

In step S54, the vehicle state detection unit 222 detects the own vehicle speed on the basis of the sensor data from the sensor unit 212. The vehicle state detection unit 222 supplies data indicating the detected own vehicle speed to the lane change determination unit 231.

In step S55, the lane change determination unit 231 determines whether or not the vehicle is traveling at a low speed. For example, in the case of (the limit speed−the own vehicle speed)≥a predetermined threshold, that is, in a case where the own vehicle speed is considerably lower than the speed limit, the lane change determination unit 231 determines that the vehicle 10 is traveling at a low speed, and the processing proceeds to step S56.

In step S56, the lane change determination unit 231 determines whether or not the lane change control function is disabled. In a case where it is determined that the lane change control function is disabled, the processing proceeds to step S57.

In step S57, the lane change determination unit 231 enables the lane change control function. Thereby, in a case where the inter-vehicle distance is less than the predetermined threshold and the vehicle 10 is traveling at a low speed, for example, in a case where the vehicle 10 is caught in a traffic jam, the lane change control function is automatically enabled. Updating of the flow comparison counter by the flow detection unit 226 described later, lane change processing by the lane change processing unit 227, and the like are started.

Thereafter, the lane-change control function automatic-setting processing ends.

On the other hand, in a case where it is determined in step S56 that the lane change control function is enabled, the processing in step S57 is skipped, and the lane-change control function automatic-setting processing ends.

Moreover, in step S55, in the case of (the speed limit−the own vehicle speed)<the predetermined threshold, that is, in a case where the vehicle 10 is traveling around or above the speed limit, the lane change determination unit 231 determines that the vehicle 10 is not traveling at a low speed, and the processing proceeds to step S58.

Furthermore, in a case where it is determined in step S52 that the inter-vehicle distance is sufficient, the processing proceeds to step S58.

In step S58, the lane change determination unit 231 determines whether or not the lane change control function is enabled. In a case where it is determined that the lane change control function is enabled, the processing proceeds to step S59.

In step S59, the lane change determination unit 231 disables the lane change control function. Thereby, in a case where the inter-vehicle distance is equal to or greater than the predetermined threshold, or in a case where the vehicle 10 is not traveling at a low speed, for example, in a case where the vehicle 10 is not caught in a traffic jam, the lane change control function is automatically disabled. Updating of the flow comparison counter by the flow detection unit 226 described later, the lane change processing by the lane change processing unit 227, and the like are stopped.

Thereafter, the lane-change control function automatic-setting processing ends.

On the other hand, in a case where it is determined in step S58 that the lane change control function is disabled, the processing in step S59 is skipped, and the lane-change control function automatic-setting processing ends.

Referring back to FIG. 3, on the other hand, in a case where it is determined in step S1 that the automatic setting of the lane change control function is disabled, the processing in step S2 is skipped, and the processing proceeds to step S3.

In step S3, the lane change determination unit 231 determines whether or not the lane change control function is enabled. In a case where it is determined that the lane change control function is disabled, the processing returns to step S1.

Thereafter, in step S3, the processing in steps S1 to S3 is repeatedly executed until it is determined that the lane change control function is enabled.

On the other hand, in a case where it is determined in step S3 that the lane change control function is enabled, the processing proceeds to step S4. This occurs in a case where the lane change control function is enabled in advance, in a case where the lane change control function is automatically enabled, or in a case where the lane change control function is enabled by an operation of the driver or the like.

In step S4, the situation analysis unit 224 determines whether or not there are a plurality of lanes in the traveling direction of the own vehicle (vehicle 10). For example, the self-position estimation unit 221 estimates the current position of vehicle 10 on the basis of the GNSS signal received by the GNSS receiver 213. The self-position estimation unit 221 supplies the data indicating the current position of the vehicle 10 to the situation analysis unit 224.

The situation analysis unit 224 recognizes the road on which the vehicle 10 is traveling on the basis of the current position of the vehicle 10 and the map data stored in the storage unit 205. In a case where the situation analysis unit 224 determines that the recognized road has one lane in the traveling direction of the vehicle 10, the processing returns to step S1.

Thereafter, the processing in steps S1 to S4 is repeatedly executed until it is determined in step S4 that there are a plurality of lanes in the traveling direction of the vehicle 10.

On the other hand, in a case where it is determined in step S4 that there are a plurality of lanes in the traveling direction of the vehicle 10, the processing proceeds to step S5.

Note that the method for determining whether or not there are a plurality of lanes in the traveling direction of the vehicle 10 is not limited to the method described above. For example, the situation analysis unit 224 may perform determination processing on the basis of the image captured by the imaging unit 211.

In step S5, the threshold setting unit 225 determines whether or not the automatic setting of the lane change threshold is enabled. In a case where it is determined that the automatic setting of the lane change threshold is enabled, the processing proceeds to step S6.

In step S6, the threshold setting unit 225 determines whether or not the lane change history of the traveling road is recorded. Specifically, the situation analysis unit 224 supplies data indicating a recognition result of the road on which the vehicle 10 is traveling to the threshold setting unit 225. In a case where a history with respect to the traveling road is included in the lane change history stored in the storage unit 205, the threshold setting unit 225 determines that the lane change history of the traveling road is recorded, and the processing proceeds to step S7.

In step S7, the threshold setting unit 225 sets the lane change threshold on the basis of the lane change history. For example, the threshold setting unit 225 calculates an average value of the flow comparison counter at the time of the past lane changes recorded on the lane change history of the traveling road, and sets the calculated value as the lane change threshold. That is, the average value of the flow comparison counter when the lane was changed by an operation of the driver on the traveling road in the past is set as the lane change threshold. The threshold setting unit 225 supplies data indicating the set lane change threshold to the lane change determination unit 231.

Note that another statistic value based on the flow comparison counter at the time of the past lane changes may be set as the lane change threshold. For example, a minimum value or a maximum value of the flow comparison counter at the time of the past lane changes may be set as the lane change threshold.

Thereafter, the processing proceeds to step S9.

On the other hand, in a case where it is determined in step S5 that the automatic setting of the lane change threshold is disabled, or in a case where it is determined in step S6 that the lane change history of the traveling road is not recorded, the processing proceeds to step S8.

In step S8, the threshold setting unit 225 sets the lane change threshold to a preset specified value. The threshold setting unit 225 supplies the data indicating the set lane change threshold to the lane change determination unit 231.

Note that, for example, the driver or the like may be able to change the specified value of the lane change threshold.

Thereafter, the processing proceeds to step S9.

In step S9, the flow detection unit 226 sets the flow comparison counter to 0, and the vehicle recognition unit 223 resets the next vehicle information.

In step S10, the vehicle recognition unit 223 determines whether or not a vehicle in the adjacent lane exists next to the own vehicle (vehicle 10). For example, the vehicle recognition unit 223 performs the recognition processing of the vehicle in the adjacent lane on the basis of an image obtained by the imaging unit 211 imaging a direction of the adjacent lane. In a case where the vehicle recognition unit 223 determines that a vehicle in the adjacent lane exists next to the own vehicle on the basis of the result of the recognition processing, the processing proceeds to step S11.

In step S11, the vehicle recognition unit 223 records the next vehicle information. Specifically, the vehicle recognition unit 223 generates the next vehicle information indicating the characteristics of the vehicle in the adjacent lane existing next to the vehicle 10, and causes the storage unit 205 to store the information.

Thereafter, the processing proceeds to step S12.

On the other hand, in a case where it is determined in step S10 that no vehicle in the adjacent lane exists next to the own vehicle, the processing in step S11 is skipped, and the processing proceeds to step S12 without recording the next vehicle information.

In step S12, the vehicle recognition unit 223 determines whether or not the next vehicle has changed. For example, the vehicle recognition unit 223 performs the recognition processing of the vehicle in the adjacent lane on the basis of the image obtained by the imaging unit 211 imaging the direction of the adjacent lane. In a case where a vehicle in the adjacent lane next to the vehicle 10 is recognized, the vehicle recognition unit 223 compares the characteristics of the vehicle with the characteristics of the vehicle indicated by the next vehicle information stored in the storage unit 205. In a case where both the characteristics do not match, the vehicle recognition unit 223 determines that the next vehicle has changed, and the processing proceeds to step S13.

Note that, in a case where the vehicle recognition unit 223 recognizes a vehicle in the adjacent lane next to the vehicle 10, and in a case where the next vehicle information has not yet been stored in the storage unit 205, that is, in a case where a vehicle in the adjacent lane next to the vehicle 10 is recognized for the first time after it is determined in step S10 that no vehicle in the adjacent lane exists next to the own vehicle, it is also determined that the next vehicle has changed, and the processing proceeds to step S13.

In step S13, the vehicle recognition unit 223 updates the next vehicle information. That is, the vehicle recognition unit 223 updates the next vehicle information to information indicating the characteristics of the newly recognized vehicle next to the vehicle 10.

In step S14, the flow detection unit 226 determines whether or not the own vehicle (vehicle 10) is faster.

For example, the vehicle recognition unit 223 detects a speed of the newly recognized next vehicle on the basis of the image obtained by the imaging unit 211 imaging the direction of the adjacent lane, the sensor data from the sensor unit 212, and the like. The vehicle recognition unit 223 supplies data indicating the speed of the next vehicle to the flow detection unit 226.

The method for detecting the speed of the next vehicle is not particularly limited.

Moreover, the vehicle state detection unit 222 detects the own vehicle speed on the basis of the sensor data from the sensor unit 212. The vehicle state detection unit 222 supplies data indicating the detected own vehicle speed to the flow detection unit 226.

The flow detection unit 226 compares the own vehicle speed with the speed of the next vehicle, and in a case where it is determined that the own vehicle (vehicle 10) is faster, the processing proceeds to step S15.

In step S15, the flow detection unit 226 decreases the flow comparison counter by one. That is, the flow detection unit 226 determines that the vehicle 10 has caught up with the next vehicle because the vehicle 10 is faster than the next vehicle, and decreases the flow comparison counter by one.

Thereafter, the processing proceeds to step S17.

On the other hand, in a case where it is determined in step S14 that the vehicle 10 is slower, the processing proceeds to step S16.

In step S16, the flow detection unit 226 increases the flow comparison counter by one. That is, the flow detection unit 226 determines that the vehicle 10 has been caught up with by the next vehicle because the next vehicle is faster than the vehicle 10, and increases the flow comparison counter by one.

Thereafter, the processing proceeds to step S17.

In step S17, the flow detection unit 226 determines whether or not the flow comparison counter is equal to or larger than the lane change threshold. In a case where it is determined that the flow comparison counter is equal to or larger than the lane change threshold, the processing proceeds to step S18.

Here, referring to FIG. 6, a specific example of the processing in steps S9 to S17, particularly, a specific example of a counting method of the flow comparison counter will be described.

Figure 6:
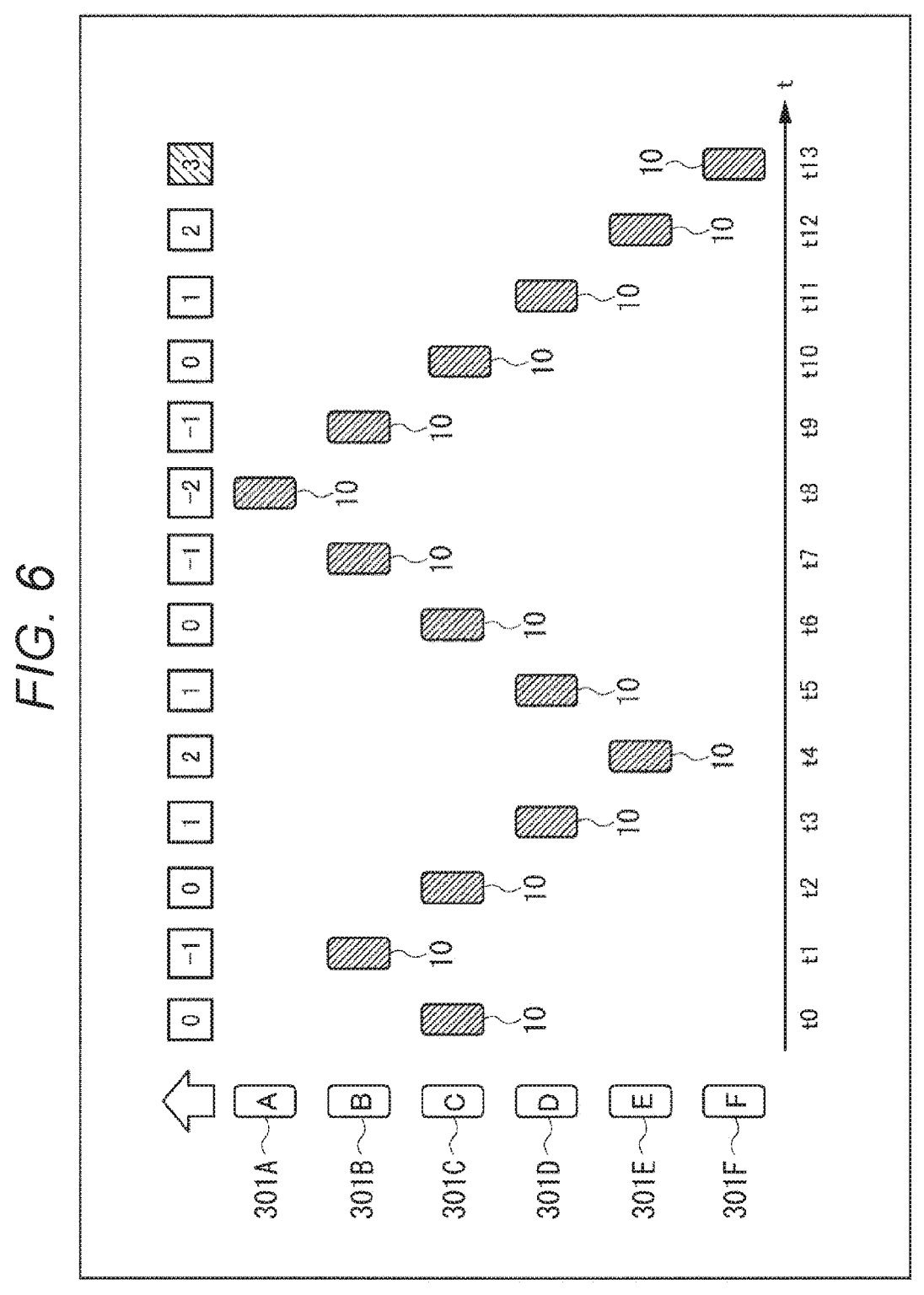

Vehicles 301A to 301F at a left end of FIG. 6 indicate a vehicle train in the adjacent lane. The vehicle train advances upward in the figure, and is arranged in order of a vehicle 301A, a vehicle 301B, a vehicle 301C, a vehicle 301D, a vehicle 301E, and a vehicle 301F from the front.

Moreover, FIG. 6 shows a relative position of the vehicle 10 with respect to the vehicle train in time series. A horizontal axis indicates time, and a vertical axis indicates the relative position of the vehicle 10 with respect to the vehicle train. Furthermore, the value of the flow comparison counter at each time is shown at an upper end.

Note that hereinafter, it is assumed that the lane change threshold is set to 3.

Moreover, hereinafter, it is assumed that at time t0, the vehicle 10 joins to a lane next to the adjacent lane in which the vehicles 301A to 301F are traveling, and that the vehicle next to the vehicle 10 at the time of the joining is the vehicle 301C. At this time, the flow comparison counter is set to 0.

At time t1, the vehicle next to the vehicle 10 changes from the vehicle 301C to the vehicle 301B. That is, the vehicle 10 has caught up with the vehicle 301B. At this time, the flow comparison counter decreases from 0 to −1. That is, the flow comparison counter indicates that after the time t0 (with the time t0 used as a reference), the number of vehicles in the adjacent lane by which the vehicle 10 has been caught up with is smaller by one than the number of vehicles in the adjacent lane that the vehicle 10 has caught up with.

At time t2, the vehicle next to the vehicle 10 changes from the vehicle 301B to the vehicle 301C. That is, the vehicle 10 has been caught up with by the vehicle 301C. At this time, the flow comparison counter increases from −1 to 0. That is, the flow comparison counter indicates that after the time t0, the number of vehicles in the adjacent lane by which the vehicle 10 has been caught up with is equal to the number of vehicles in the adjacent lane that the vehicle 10 has caught up with.

At time t3, the vehicle next to the vehicle 10 changes from the vehicle 301C to the vehicle 301D. That is, the vehicle 10 has been overtaken by the vehicle 301C and has been caught up with by the vehicle 301D. At this time, the flow comparison counter increases from 0 to 1. That is, the flow comparison counter indicates that, after the time t0, the number of vehicles in the adjacent lane by the vehicle 10 has been caught up with is larger by one than the number of vehicles in the adjacent lane that the vehicle 10 has caught up with.

At time t4, the vehicle next to the vehicle 10 changes from the vehicle 301D to the vehicle 301E. That is, the vehicle 10 has been overtaken by the vehicle 301D and has been caught up with by the vehicle 301E. At this time, the flow comparison counter increases from 1 to 2. That is, the flow comparison counter indicates that after the time t0, the number of vehicles in the adjacent lane by which the vehicle 10 has been caught up with is larger by two than the number of vehicles in the adjacent lane that the vehicle 10 has caught up with.

At time t5, the vehicle next to the vehicle 10 changes from the vehicle 301E to the vehicle 301D. That is, the vehicle 10 has caught up with the vehicle 301D. At this time, the flow comparison counter decreases from 2 to 1. That is, the flow comparison counter indicates that after the time t0, the number of vehicles in the adjacent lane by which the vehicle 10 has been caught up with is larger by one than the number of vehicles in the adjacent lane that the vehicle 10 has caught up with.

At time t6, the vehicle next to the vehicle 10 changes from the vehicle 301D to the vehicle 301C. That is, the vehicle 10 has overtaken the vehicle 301D and has caught up with the vehicle 301C. At this time, the flow comparison counter decreases from 1 to 0. That is, the flow comparison counter indicates that after the time t0, the number of vehicles in the adjacent lane by which the vehicle 10 has been caught up with is equal to the number of vehicles in the adjacent lane that the vehicle 10 has caught up with.

At time t7, the vehicle next to the vehicle 10 changes from the vehicle 301C to the vehicle 301B. That is, the vehicle 10 has overtaken the vehicle 301C and has caught up with the vehicle 301B. At this time, the flow comparison counter decreases from 0 to −1. That is, the flow comparison counter indicates that after the time t0, the number of vehicles in the adjacent lane by which the vehicle 10 has been caught up with is smaller by one than the number of vehicles in the adjacent lane that the vehicle 10 has caught up with.

At time t8, the vehicle next to the vehicle 10 changes from the vehicle 301B to the vehicle 301A. That is, the vehicle 10 has overtaken the vehicle 301B and has caught up with the vehicle 301A. At this time, the flow comparison counter decreases from −1 to −2. That is, the flow comparison counter indicates that after the time t0, the number of vehicles in the adjacent lane by which the vehicle 10 has been caught up with is smaller by two than the number of vehicles in the adjacent lane that the vehicle 10 has caught up with.

At time t9, the vehicle next to the vehicle 10 changes from the vehicle 301A to the vehicle 301B. That is, the vehicle 10 has been caught up with by the vehicle 301B. At this time, the flow comparison counter increases from −2 to −1. That is, the flow comparison counter indicates that after the time t0, the number of vehicles in the adjacent lane by which the vehicle 10 has been caught up with is smaller by one than the number of vehicles in the adjacent lane that the vehicle 10 has caught up with.

At time t10, the vehicle next to the vehicle 10 changes from the vehicle 301B to the vehicle 301C. That is, the vehicle 10 has been overtaken by the vehicle 301B and has been caught up with by the vehicle 301C. At this time, the flow comparison counter increases from −1 to 0. That is, the flow comparison counter indicates that after the time t0, the number of vehicles in the adjacent lane by which the vehicle 10 has been caught up with is equal to the number of vehicles in the adjacent lane that the vehicle 10 has caught up with.

At time t11, the vehicle next to the vehicle 10 changes from the vehicle 301C to the vehicle 301D. That is, the vehicle 10 has been overtaken by the vehicle 301C and has been caught up with by the vehicle 301D. At this time, the flow comparison counter increases from 0 to 1. That is, the flow comparison counter indicates that after the time t0, the number of vehicles in the adjacent lane by the vehicle 10 has been caught up with is larger by one than the number of vehicles in the adjacent lane that the vehicle 10 has caught up with.

At time t12, the vehicle next to vehicle 10 has changed from the vehicle 301D to the vehicle 301E. That is, the vehicle 10 has been overtaken by the vehicle 301D and has been caught up with by the vehicle 301E. At this time, the flow comparison counter increases from 1 to 2. That is, the flow comparison counter indicates that after the time t0, the number of vehicles in the adjacent lane by which the vehicle 10 has been caught up with is larger by two than the number of vehicles in the adjacent lane that the vehicle 10 has caught up with.

At time t13, the vehicle next to the vehicle 10 changes from the vehicle 301E to the vehicle 301F. That is, the vehicle 10 has been overtaken by the vehicle 301E and has been caught up with by the vehicle 301F. At this time, the flow comparison counter increases from 2 to 3. That is, the flow comparison counter indicates that after the time t0, the number of vehicles in the adjacent lane by which the vehicle 10 has been caught up with is larger by three than the number of vehicles in the adjacent lane that the vehicle 10 has caught up with.

At this time t13, the flow comparison counter is equal to the lane change threshold, so that in step S17, it is determined that the flow comparison counter is equal to or larger than the lane change threshold, and the processing proceeds to step S18.

In step S18, the situation analysis unit 224 determines whether or not there is a factor in the adjacent lane that hinders the flow of the vehicles in the traveling direction of the own vehicle (vehicle 10).

Specifically, the situation analysis unit 224 performs the recognition processing of the situation in the traveling direction of the vehicle 10 on the basis of the image around the vehicle 10 captured by the imaging unit 211, the sensor data from the sensor unit 212, the current position of the vehicle 10 recognized by the self-position estimation unit 221, the map data stored in the storage unit 205, and the like. Moreover, on the basis of the recognition results of the situation in the traveling direction of the vehicle 10, the situation analysis unit 224 determines whether or not there is a factor in the adjacent lane that hinders the flow of the vehicles in the traveling direction of the vehicle 10. In a case where the situation analysis unit 224 determines that there is no factor in the adjacent lane that hinders the flow of the vehicles in the traveling direction of the vehicle 10, the situation analysis unit 224 notifies the lane change determination unit 231 of the determination result. Thereafter, the processing proceeds to step S19.

Note that a method for recognizing the situation in the traveling direction of the vehicle 10 is not particularly limited.

In step S19, the lane change determination unit 231 determines whether or not the automatic driving is being performed. In a case where it is determined that the automatic driving is being performed, the processing proceeds to step S20.

In step S20, the vehicle 10 performs a lane change. Specifically, the lane change determination unit 231 instructs the motion control unit 233 to carry out the lane change to the adjacent lane. The motion control unit 233, for example, controls the drive system control unit 107 of the vehicle 10 in FIG. 1 and causes the vehicle 10 to change the lane from the traveling lane to the adjacent lane.

Thereafter, the processing proceeds to step S24.

On the other hand, in a case where it is determined in step S19 that the automatic driving is not being performed, the processing proceeds to step S21.

In step S21, the lane change control system 200 proposes a lane change. Specifically, the lane change determination unit 231 instructs the presentation control unit 232 to propose a lane change to the adjacent lane. The presentation unit 204 proposes a lane change under the control of the presentation control unit 232.

Note that a lane change proposal method is not particularly limited. For example, the presentation unit 204 displays an image that proposes the lane change to the adjacent lane, or outputs a voice that proposes the lane change to the adjacent lane. This prompts the driver to change the lane to the adjacent lane.

In step S22, the situation analysis unit 224 determines whether or not the lane change has been performed. In a case where it is determined that the lane change has been performed, the processing proceeds to step S23.

Note that a method for determining whether or not the lane change has been performed is not particularly limited. For example, the situation analysis unit 224 determines whether or not the lane change has been performed on the basis of the current position of the vehicle 10 recognized by the self-position estimation unit 221, and the map data stored in the storage unit 205. Moreover, for example, the situation analysis unit 224 determines whether or not the lane change has been performed on the basis of at least one or more of the image around the vehicle 10 captured by the camera, the sensor data from the sensor unit 212, and the state of the vehicle 10 detected by the vehicle state detection unit 222.

In step S23, the lane change determination unit 231 updates the lane change history. Specifically, the situation analysis unit 224 supplies the lane change determination unit 231 with data indicating that the lane change has been performed and the road on which the lane change has been performed. The lane change determination unit 231 newly adds, to the lane change history stored in the storage unit 205, the date and time when the current lane change was performed, the road on which the lane change was performed, and the history including the value of the flow comparison counter at the time of the lane change.

Thereafter, the processing proceeds to step S24.

On the other hand, in a case where it is determined in step S22 that the lane change has not been performed, the processing in step S23 is skipped, and the processing proceeds to step S24.

Moreover, in step S18, in a case where it is determined that there is a factor in the adjacent lane that hinders the flow of the vehicle in the traveling direction of the own vehicle, the processing in steps S19 to S23 is skipped, and the processing proceeds to step S24. That is, in this case, although the flow comparison counter is equal to or larger than the lane change threshold, the lane change is neither carried out nor proposed.

Figure 7:
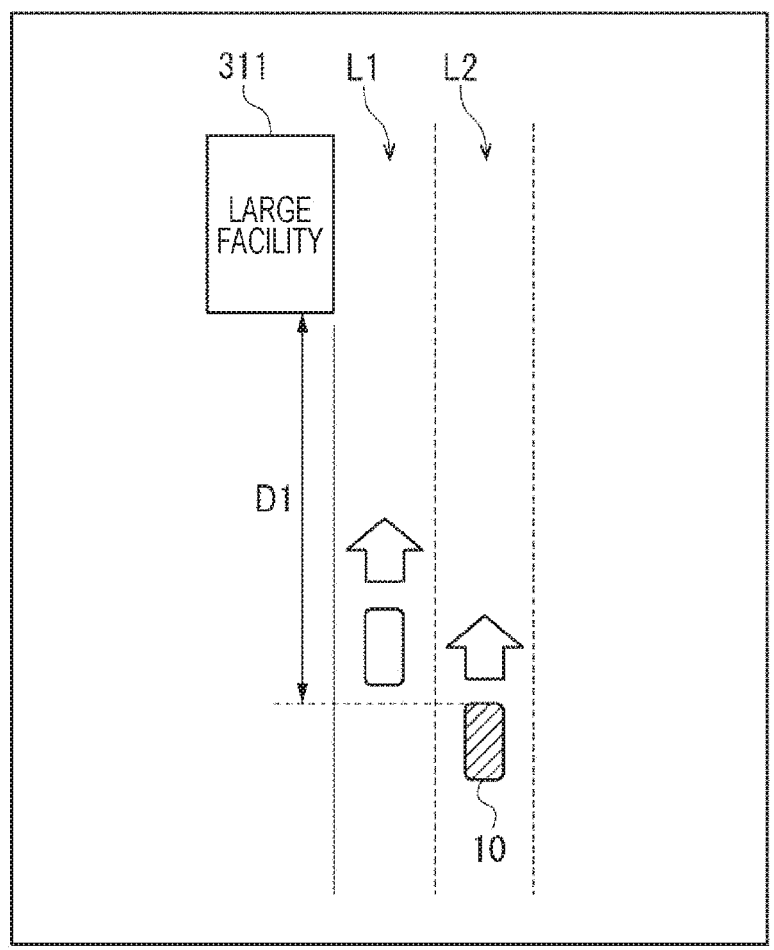
FIG. 7 is a diagram showing an example of a determination method as to whether to carry out a lane change.

For example, in an example of FIG. 7, a large facility 311 having many parking spaces such as a large commercial facility, a service area, or the like is adjacent to a lane L1. Since many vehicles enter and exit from the large facility 311, it is assumed that the flow of the vehicles in the lane L1 near the large facility 311 becomes worse. Accordingly, for example, in a case where the flow comparison counter becomes equal to or larger than the lane change threshold while the vehicle 10 is traveling in a lane L2, when a distance D1 between the vehicle 10 and the large facility 311 is less than a predetermined threshold, it is determined that the lane L1, which is the adjacent lane, has a factor that hinders the flow of the vehicles in the traveling direction of the vehicle 10. On the other hand, in a case where the distance D1 is equal to or larger than the predetermined threshold, the large facility 311 is not considered to be a factor that hinders the flow of vehicles.

Moreover, for example, in a case where in the traveling direction of the vehicle 10, there is a bus stop, a construction site, an accident site, a broken vehicle, or the like in the adjacent lane, and within a predetermined distance from the vehicle 10, it is determined that there is a factor in the adjacent lane that hinders the flow of the vehicles in the traveling direction of the vehicle 10.

Further, for example, in a case where the vehicle 10 travels straight, and in a case where the adjacent lane becomes a left-turn only lane or a right-turn only lane within a predetermined distance from the vehicle 10, it is determined that there is a factor in the adjacent lane that hinders the flow of the vehicles in the traveling direction of the vehicle 10.

Note that the flow comparison counter is updated even in a period when it is determined that there is a factor in the adjacent lane that hinders the flow of the vehicles in the traveling direction of the vehicle 10, and the lane change is neither carried out nor proposed. Thereafter, when it is determined that there is no factor in the adjacent lane that hinders the flow of the vehicles in the traveling direction of the vehicle 10, the lane change is performed or proposed if the flow comparison counter is equal to or larger than the lane change threshold.

Figure 8:
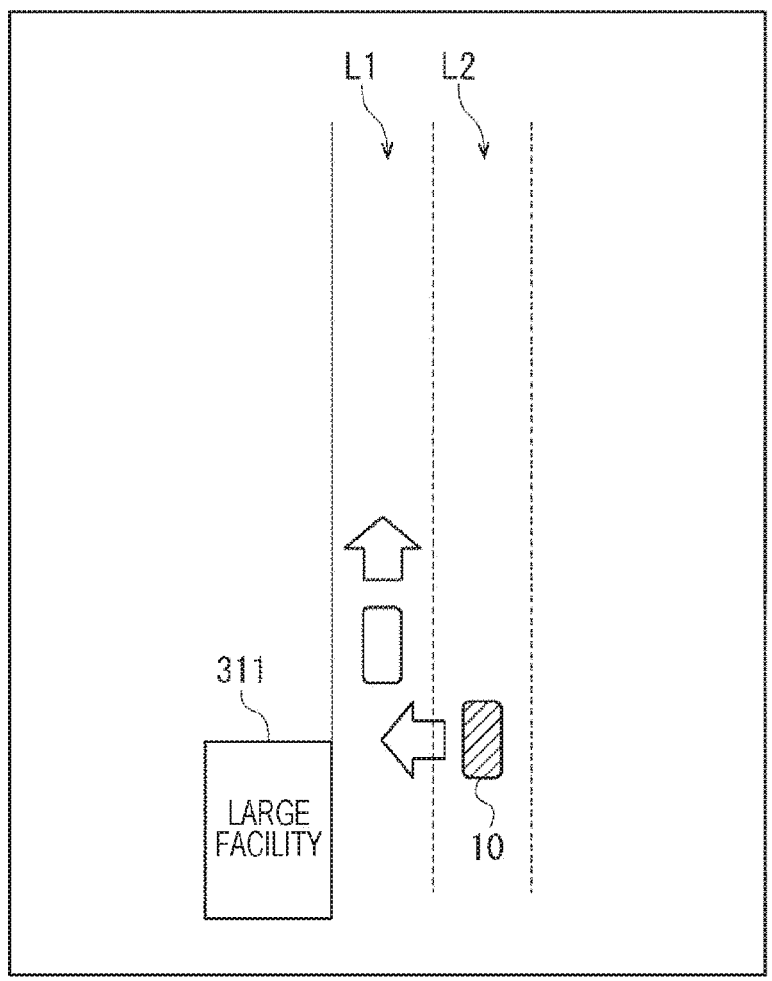
FIG. 8 is a diagram showing an example of the method for determining whether to carry out a lane change.

For example, after a state shown in FIG. 7, as shown in FIG. 8, in a case where the flow comparison counter is equal to or larger than the lane change threshold at a time point when the vehicle 10 passes by the large facility 311, the lane change to the lane L1 is carried out or proposed.

Referring back to FIG. 4, further, in a case where it is determined in step S17 that the flow comparison counter is smaller than the lane change threshold, the processing in steps S18 to S23 is skipped, and the processing proceeds to step S24.

Moreover, in step S12, in a case where the recognized characteristics of the next vehicle matches the characteristics of the vehicle indicated by the next vehicle information stored in the storage unit 205, or in a case where no vehicle exists next to the vehicle 10, the vehicle recognition unit 223 determines that the next vehicle has not changed, and the processing in steps S13 to S23 is skipped, and the processing proceeds to step S24.

In step S24, the situation analysis unit 224 determines whether or not the traveling road or lane has changed.

For example, the situation analysis unit 224 determines whether or not the traveling road has changed on the basis of the image around the vehicle 10 captured by the imaging unit 211, the sensor data from the sensor unit 212, the current position of the vehicle 10 recognized by the self-position estimation unit 221, the map data stored in the storage unit 205 and the like. For example, in a case where the vehicle 10 has entered another road or changed the traveling direction due to a left turn, a right turn, a U-turn, or the like, or in a case where the number of lanes in the traveling direction of the vehicle 10 on the traveling road has changed, it is determined that the traveling road has changed.

Moreover, the situation analysis unit 224 determines whether or not the traveling road has changed on the basis of the image around the vehicle 10 captured by the imaging unit 211, the sensor data from the sensor unit 212, the current position of the vehicle 10 recognized by the self-position estimation unit 221, the state of the vehicle 10 detected by the vehicle state detection unit 222, the map data stored in the storage unit 205 and the like.

Note that the method for determining whether or not the traveling road and the lane have changed is not particularly limited.

In a case where it is determined that the traveling road and the lane have not changed, the processing proceeds to step S25.

In step S25, similarly to the processing in step S1, it is determined whether or not the automatic setting of the lane change control function is enabled. In a case where it is determined that the automatic setting of the lane change control function is enabled, the processing proceeds to step S26.

In step S26, the lane-change control function automatic-setting processing is executed similarly to the processing in step S2.

Thereafter, the processing proceeds to step S27.

On the other hand, in a case where it is determined in step S25 that the automatic setting of the lane change control function is disabled, the processing in step S26 is skipped, and the processing proceeds to step S27.

In step S27, similarly to the processing in step S3, it is determined whether or not the lane change control function is enabled. In a case where it is determined that the lane change control function is enabled, the processing returns to step S12, and the processing in step S12 and later is executed.

On the other hand, in a case where it is determined in step S27 that the lane change control function is disabled, the processing returns to step S1, and the processing in step S1 and later is executed. This is a case where the lane change control function is automatically disabled or a case where the lane change control function is disabled by an operation of the driver or the like.

Moreover, in a case where it is determined in step S24 that the traveling road or lane has changed, the processing returns to step S1, and the processing in step S1 and later is executed. That is, since the road or lane where the vehicle 10 travels has changed, the processing is restarted from the beginning.

As described above, the flow of the vehicles in the traveling lane and the flow of the vehicles in the adjacent lane can be accurately compared. Moreover, in both the automatic driving and the manual driving, it is possible to appropriately propose or carry out the lane change to the adjacent lane.

3. Modifications

Hereinafter, modifications of the above-described embodiment of the present technology will be described.

For example, a lane change may be proposed to the driver before the lane change to the adjacent lane is automatically performed during the automatic driving.

Moreover, for example, the presentation control unit 232 may cause the presentation unit 204 to present the situation of the flow of the vehicles in the adjacent lane on the basis of the flow comparison counter. For example, the presentation control unit 232 may cause the value of the flow comparison counter to be presented as it is, or may cause the information indicating the comparison results of the flow of the vehicles between the traveling lane and the adjacent lane to be presented.

Furthermore, while in the above description, the case where the adjacent lane is one lane has been mainly described, in a case where the adjacent lanes are two lanes, that is, in a case where there are adjacent lanes on both sides of the traveling lane, a lane change can also be proposed and carried out by similar processing. For example, the flow comparison counter is updated for each of the adjacent lanes, and in a case where the flow comparison counter for one of the adjacent lanes becomes equal to or larger than the threshold, a lane change to the relevant adjacent lane is proposed or carried out. Obviously, in this case as well, in a case where in the adjacent lane for which the flow comparison counter has become equal to or larger than the threshold, there is a factor that hinders the flow of the vehicles in the traveling direction of the vehicle 10, it is possible not to propose or carry out the lane change to the adjacent lane. Moreover, in a case where the flow comparison counters for both the adjacent lanes are equal to or larger than the threshold, for example, a lane change to the lane for which the flow comparison counter is larger, or to the lane having no factor that hinders the flow of the vehicles in the traveling direction of the vehicle 10 is proposed or carried out.

Moreover, for example, a number of the lane change histories to be recorded may be limited. For example, an upper limit value of the number of the lane change histories may be set for each road.

Furthermore, for example, instead of recording the lane change history, an average value of the flow comparison counter at the time of lane change, or the like may be recorded for each road.

Moreover, for example, the lane change history may be recorded even in a case where the lane change is carried out by the automatic driving. In this case, the lane change threshold may be set, using the history of the flow comparison counter in a case where the lane is changed by the automatic driving, in addition to the history of the flow comparison counter in a case where the lane is changed by the manual driving.

Furthermore, for example, the presentation unit 204 may be configured to indicate which of a specified value and an automatically set value is used as the lane change threshold.

Moreover, for example, the lane change control function may be automatically set on the basis of only one of the inter-vehicle distance, and a difference between the own vehicle speed and the speed limit. Furthermore, for example, the lane change control function may be automatically set on the basis of only the own vehicle speed without comparing with the speed limit.

Furthermore, while in the above description, the example has been described in which the lane change determination unit 231 carries out the automatic setting of the lane change control function, for example, the other function block such as the flow detection unit 226 or the like may perform the automatic setting.

Alternatively, the automatic setting to enable or disable only a partial function of the lane change control function may be performed. For example, the automatic setting to enable or disable only the lane change processing may be performed, and the flow comparison counter may constantly be updated.

Furthermore, while in the above description, the flow comparison counter is represented by the difference value between the number of vehicles in the adjacent lane by which the vehicle 10 has been caught up with and the number of vehicles in the adjacent lane that the vehicle 10 has caught up with, the flow comparison counter may be represented, for example, by a difference value between a number of vehicles in the adjacent lane by which the vehicle 10 has been overtaken, and a number of vehicles in the adjacent lane that the vehicle 10 has overtaken.

In this case, for example, in the example of FIG. 6, at the time t3, when the vehicle next to the vehicle 10 changes from the vehicle 301C to the vehicle 301D, it is determined that the vehicle 10 has been overtaken by the vehicle 301C, and the flow comparison counter is increased by one. Moreover, for example, at the time t7, when the vehicle next to vehicle 10 changes from the vehicle 301C to the vehicle 301B, it is determined that vehicle 10 has overtaken the vehicle 301C, and the flow comparison counter is decreased by one.

Furthermore, while in the above description, the case where the vehicles travel on the left is described, obviously, the present technology can also be applied to a case where the vehicles travel on the right. Note that in the case where the vehicles travel on the right side, for example, in the examples of FIGS. 7 and 8, the position of the large facility 311 and the lane in which the vehicle 10 travels are reversed left and right. For example, the vehicle 10 travels in the lane L1, and the large facility 311 is adjacent to the right side of the lane L2.

Moreover, the present technology can also be applied to other vehicles traveling on a road such as a motorcycle, a personal mobility, and the like in addition to the vehicles exemplified above.

4. Others

<Configuration Example of Computer>

The series of processing described above can be executed by hardware or can be executed by software. In a case where the series of processing is executed by software, a program configuring the software is installed in a computer. Here, the computer includes a computer incorporated in dedicated hardware, for example, a general-purpose personal computer that can execute various functions by installing various programs, and the like.

Figure 9:
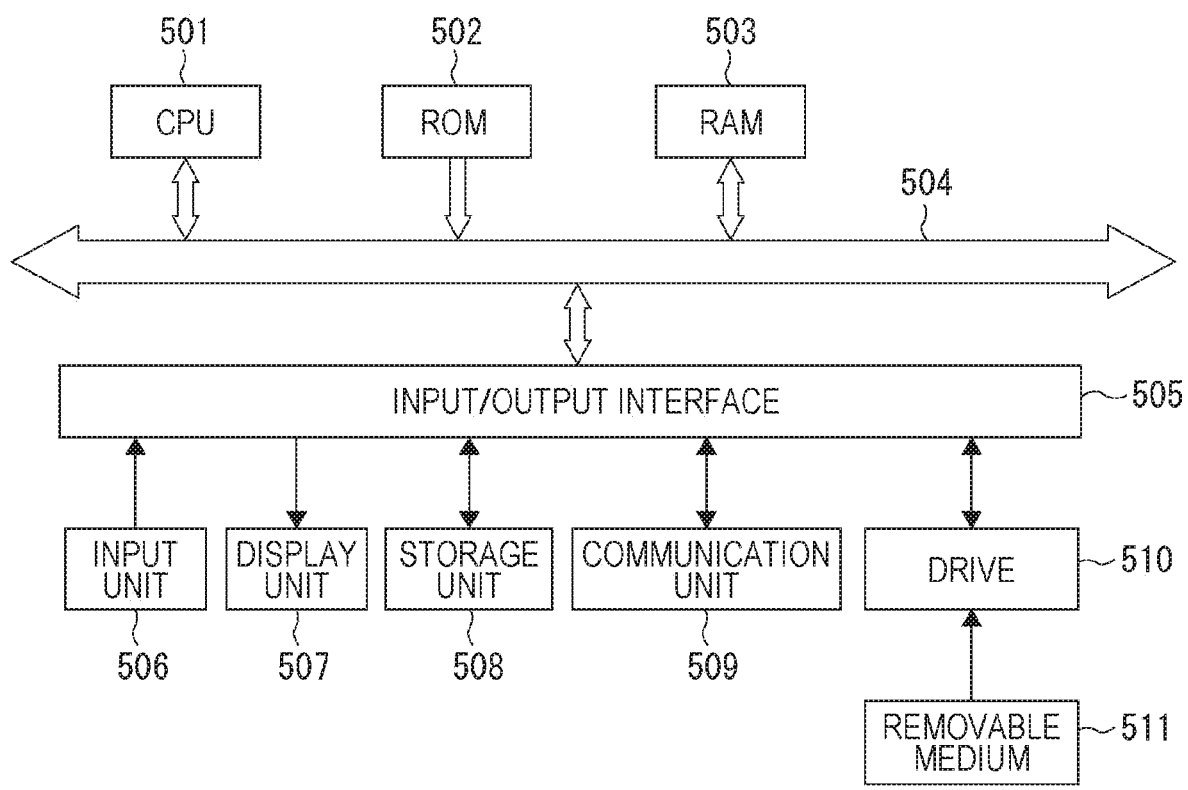
FIG. 9 is a diagram showing a configuration example of a computer.

FIG. 9 is a block diagram showing a configuration example of the hardware of the computer that executes the series of processing described above by the program.

In a computer 500, a central processing unit (CPU) 501, a read only memory (ROM) 502, and a random access memory (RAM) 503 are interconnected by a bus 504.

To the bus 504 is further connected an input/output interface 505. To the input/output interface 505 are connected an input unit 506, an output unit 507, a recording unit 508, a communication unit 509, and a drive 510.

The input unit 506 includes an input switch, a button, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, a semiconductor memory, or the like.

In the computer 500 configured as described above, the CPU 501, for example, loads the program on the RAM 503 via the input/output interface 505 and the bus 504, the program being recorded on the recording unit 508, and executes the program, by which the above-described series of processing is performed.

The program executed by the computer 500 (CPU 501) can be provided, for example, by being recorded on the removable recording medium 511 as a package medium or the like. Moreover, the program can be provided via a wired or wireless transmission medium such as a local area network, the Internet, or digital satellite broadcasting.

In the computer 500, the program can be installed in the recording unit 508 via the input/output interface 505 by mounting the removable recording medium 511 on the drive 510. Moreover, the program can be received by the communication unit 509 via a wired or wireless transmission medium and installed in the recording unit 508. In addition, the program can be installed in the ROM 502 or the recording unit 508 in advance.

Note that the program executed by the computer may be a program that performs the processing in time series in the order described in this specification, or a program that performs the pieces of processing in parallel, or at necessary timing such as when a call is made or the like.

Moreover, in the present specification, a system means a set of a plurality of components (apparatuses, modules (parts), and the like), and it does not matter whether or not all the components are in the same housing. Accordingly, a plurality of apparatuses housed in separate housings and connected via a network, and a single apparatus housing a plurality of modules in one housing are both systems.

Furthermore, embodiments of the present technology are not limited to the embodiment described above, and various changes can be made within a range not departing from the gist of the present technology.

For example, the present technology can have a configuration of cloud computing in which one function is shared by a plurality of apparatuses via a network and processed jointly.

Moreover, each of the steps described in the foregoing flowchart can be executed by one apparatus, or can be executed by being shared by a plurality of apparatuses.

Furthermore, in a case where a plurality of pieces of processing is included in one step, the plurality of pieces of processing included in the one step can be executed by one apparatus, or can be executed by being shared by a plurality of apparatuses.

<Examples of Configuration Combination>

The present technology can also have the following configurations.

(1)

An information processing apparatus including:

a vehicle recognition unit that performs recognition of a vehicle in a second lane that is adjacent to a first lane in which an own vehicle is traveling, and has a same traveling direction as the first lane; and a flow detection unit that detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

(2)

The information processing apparatus according to (1), further including:

a lane change processing unit that performs lane change processing related to a lane change of the own vehicle on the basis of a difference value indicating the first difference or the second difference.

(3)

The information processing apparatus according to (2), in which the lane change processing unit performs the lane change processing in a case where the difference value is equal to or larger than a predetermined threshold.

(4)

The information processing apparatus according to (3), further including a situation analysis unit that detects a factor in the second lane that hinders a flow of the vehicle in the traveling direction of the own vehicle, in which the lane change processing unit performs the lane change processing in a case where the difference value is equal to or larger than the predetermined threshold, and the factor is not detected.

(5)

The information processing apparatus according to (3) or (4), further including a threshold setting unit that sets the threshold on the basis of a history of the difference value when the lane is changed by an operation of a driver on a road including the first lane and the second lane.

(6)

The information processing apparatus according to any of (2) to (5), in which the lane change processing unit sets whether to perform the lane change processing based on the difference value, on the basis of at least one of an inter-vehicle distance between a vehicle in front of the own vehicle in the first lane and the own vehicle, and a speed of the own vehicle.

(7)

The information processing apparatus according to any of (2) to (6), in which the lane change processing includes at least one of proposal of a lane change to the second lane and control of a lane change of the own vehicle to the second lane.

(8)

The information processing apparatus according to any of (1) to (7), in which in a case where the vehicle in the second lane next to the own vehicle has changed from a first vehicle to a second vehicle, the flow detection unit determines whether the own vehicle has been caught up with or overtaken by the second vehicle, or whether the own vehicle has caught up with or overtaken the second vehicle by comparing the speed of the own vehicle and a speed of the second vehicle.

(9)

The information processing apparatus according to any of (1) to (8), further including a presentation control unit that controls presentation of a situation of a flow of the vehicle in the second lane on the basis of the first difference or the second difference.

(10)

An information processing method, in which an information processing apparatus performs recognition of a vehicle in a second lane that is adjacent to a first lane in which an own vehicle is traveling, and has a same traveling direction as the first lane, and detects a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

(11)

A program that causes a computer to execute processing for:

performing recognition of a vehicle in a second lane that is adjacent to a first lane in which an own vehicle is traveling, and has a same traveling direction as the first lane; and detecting a first difference between a number of vehicles in the second lane by which the own vehicle has been caught up with, and a number of vehicles in the second lane that the own vehicle has caught up with, or a second difference between a number of vehicles in the second lane by which the own vehicle has been overtaken, and a number of vehicles in the second lane that the own vehicle has overtaken on the basis of a recognition result of the vehicle in the second lane.

(12)

A vehicle including:

a vehicle recognition unit that performs recognition of a vehicle in a second lane that is adjacent to a first lane in which the vehicle is traveling, and has a same traveling direction as the first lane;

a flow detection unit that detects a first difference between a number of vehicles in the second lane by which the vehicle has been caught up with, and a number of vehicles in the second lane that the vehicle has caught up with, or a second difference between a number of vehicles in the second lane by which the vehicle has been overtaken, and a number of vehicles in the second lane that the vehicle has overtaken on the basis of a recognition result of the vehicle in the second lane; and a motion control unit that controls so that the vehicle performs a lane change in accordance with the first difference or the second difference.

Note that the effects described in the present specification are illustrative and are not limited, and may have additional effects.

REFERENCE SIGNS LIST

10 Vehicle
100 Vehicle control system
102 Data acquisition unit
105 Output control unit
106 Output unit
132 Self-position estimation unit
133 Situation analysis unit
135 Motion control unit
141 Out-vehicle information detection unit
162 Action planning unit
163 Motion planning unit
200 Lane change control system
202 Data acquisition unit
203 Information processing unit
204 Presentation unit
211 Imaging unit
212 Sensor unit
213 GNSS receiver
221 Self-position estimation unit
222 Vehicle state detection unit
223 Vehicle recognition unit
224 Situation analysis unit
225 Threshold setting unit
226 Flow detection unit
231 Lane change determination unit
232 Presentation control unit
233 Motion control unit

The invention claimed is:

1. An information processing apparatus, comprising:
a vehicle recognition unit configured to perform recognition of a first vehicle in a first lane that is adjacent to a second lane, wherein
a second vehicle is in the second lane, and
a traveling direction of the first vehicle in the first lane is same as a traveling direction of the second vehicle in the second lane;
a flow detection unit configured to detect one of a first difference between a first number of vehicles in the first lane by which the second vehicle has been caught up with and a second number of vehicles in the first lane that the second vehicle has caught up with, or a second difference between a third number of vehicles in the first lane by which the second vehicle has been overtaken and a fourth number of vehicles in the first lane that the second vehicle has overtaken, based on the recognition of the first vehicle in the first lane;
a situation analysis unit configured to detect a factor, in the first lane, that hinders a flow of the first vehicle in the traveling direction of the second vehicle; and
a lane change processing unit configured to perform, when the factor is not detected, a lane change process related to a lane change of the second vehicle, based on one of the first difference or the second difference is equal to or larger than a threshold value.

2. The information processing apparatus according to claim 1, further comprising a threshold setting unit configured to set the threshold value, based on a history of a difference value when a lane is changed by an operation of a driver on a road including the first lane and the second lane, wherein
the difference value indicates a value of the first difference or the second difference.

3. The information processing apparatus according to claim 1, wherein
a difference value indicates a value of the first difference or the second difference, and
the lane change processing unit is further configured to determine whether to perform the lane change process based on the difference value, based on
at least one of an inter-vehicle distance between a third vehicle that is in front of the second vehicle in the second lane and the second vehicle, or
a speed of the second vehicle.

4. The information processing apparatus according to claim 1, wherein
the lane change process includes at least one of a proposal of the lane change to the first lane or control of the lane change of the second vehicle to the first lane.

5. The information processing apparatus according to claim 1, wherein
in a case where the first vehicle in the first lane next to the second vehicle has changed to a third vehicle, the flow detection unit is further configured to determine one of whether the second vehicle has been caught up with or overtaken by the third vehicle, or whether the second vehicle has caught up with or overtaken the third vehicle, based on a comparison of a speed of the second vehicle and a speed of the third vehicle.

6. The information processing apparatus according to claim 1, further comprising a presentation control unit configured to control a presentation of a situation of a flow of the first vehicle in the first lane, based on one of the first difference or the second difference.

7. An information processing method, comprising:
performing recognition of a first vehicle in a first lane that is adjacent to a second lane, wherein
a second vehicle is in the second lane, and
a traveling direction of the first vehicle in the first lane is same as a traveling direction of the second vehicle in the second lane;
detecting one of a first difference between a first number of vehicles in the first lane by which the second vehicle has been caught up with and a second number of vehicles in the first lane that the second vehicle has caught up with, or a second difference between a third number of vehicles in the first lane by which the second vehicle has been overtaken and a fourth number of vehicles in the first lane that the second vehicle has overtaken, based on the recognition of the first vehicle in the first lane;

detecting a factor, in the first lane, that hinders a flow of the first vehicle in the traveling direction of the second vehicle; and performing, when the factor is not detected, a lane change processing related to a lane change of the second vehicle, based on one of the first difference or the second difference is equal to or larger than a threshold value.

8. A non-transitory computer-readable medium having stored thereon computer-executable instructions which, when executed by a processor, cause the processor to execute operations, the operations comprising:

performing recognition of a first vehicle in a first lane that is adjacent to a second lane, wherein
a second vehicle is in the second lane, and
a traveling direction of the first vehicle in the first lane is same as a traveling direction of the second vehicle in the second lane;

detecting one of a first difference between a first number of vehicles in the first lane by which the second vehicle has been caught up with and a second number of vehicles in the first lane that the second vehicle has caught up with, or a second difference between a third number of vehicles in the first lane by which the second vehicle has been overtaken and a fourth number of vehicles in the first lane that the second vehicle has overtaken, based on the recognition of the first vehicle in the first lane;

detecting a factor, in the first lane, that hinders a flow of the first vehicle in the traveling direction of the second vehicle; and performing, when the factor is not detected, a lane change processing related to a lane change of the second vehicle, based on one of the first difference or the second difference is equal to or larger than a threshold value.

9. A vehicle, comprising:

a vehicle recognition unit configured to perform recognition of a specific vehicle in a first lane that is adjacent to a second lane, wherein
the vehicle is in the second lane, and
a traveling direction of the specific vehicle in the first lane is same as a traveling direction of the vehicle in the second lane;

a flow detection unit configured to detect one of a first difference between a first number of vehicles in the first lane by which the vehicle has been caught up with and a second number of vehicles in the first lane that the vehicle has caught up with, or a second difference between a third number of vehicles in the first lane by which the vehicle has been overtaken and a fourth number of vehicles in the first lane that the vehicle has overtaken, based on the recognition of the specific vehicle in the first lane;

a situation analysis unit configured to detect a factor, in the first lane, that hinders a flow of the specific vehicle in the traveling direction of the vehicle; and a motion control unit configured to control the vehicle to perform, when the factor is not detected, a lane change, based on one of the first difference or the second difference is equal to or larger than a threshold value.

* * * * *